(12) United States Patent
Camozzi et al.

(10) Patent No.: US 12,044,281 B2
(45) Date of Patent: Jul. 23, 2024

(54) METHOD AND SYSTEM FOR DETECTING AND MEASURING A BRAKING FORCE OF A BRAKING SYSTEM FOR VEHICLE, BY MEANS OF PHOTONIC SENSORS INCORPORATED IN A BRAKE PAD

(71) Applicant: BREMBO S.p.A., Curno (IT)

(72) Inventors: Francesco Camozzi, Curno (IT); Luca Maestrini, Curno (IT); Alessandro Casini, Curno (IT); Tiziano Nannipieri, Curno (IT); Salvatore Bonomo, Curno (IT)

(73) Assignee: Brembo S.p.A., Curno (IT)

( * ) Notice: Subject to any disclaimer, the term of this patent is extended or adjusted under 35 U.S.C. 154(b) by 400 days.

(21) Appl. No.: 17/618,095

(22) PCT Filed: Jun. 10, 2020

(86) PCT No.: PCT/IB2020/055447
§ 371 (c)(1),
(2) Date: Dec. 10, 2021

(87) PCT Pub. No.: WO2020/250146
PCT Pub. Date: Dec. 17, 2020

(65) Prior Publication Data
US 2022/0299082 A1    Sep. 22, 2022

(30) Foreign Application Priority Data
Jun. 13, 2019 (IT) .................. 102019000008874

(51) Int. Cl.
*F16D 66/02* (2006.01)
*G01B 11/16* (2006.01)
(Continued)

(52) U.S. Cl.
CPC ............ *F16D 66/028* (2013.01); *G01B 11/18* (2013.01); *G01L 1/243* (2013.01); *G01L 5/0042* (2013.01);
(Continued)

(58) Field of Classification Search
CPC ................................................ F16D 2066/005
See application file for complete search history.

(56) References Cited

U.S. PATENT DOCUMENTS

| 4,995,480 A | 2/1991 | Hazelden et al. |
| 6,067,159 A | 5/2000 | Discenzo et al. |

(Continued)

FOREIGN PATENT DOCUMENTS

| DE | 10351478 B4 * | 5/2013 | ........... F16D 65/092 |
| DE | 102012104877 A1 | 12/2013 | |

(Continued)

OTHER PUBLICATIONS

European Patent Office, International Search Report with Written Opinion, issued in PCT/IB2020/055447, Sep. 3, 2020, 11 pages, European Patent Office, Rijswijk, Netherlands.

(Continued)

*Primary Examiner* — Melanie Torres Williams
(74) *Attorney, Agent, or Firm* — Marshall & Melhorn, LLC

(57) ABSTRACT

A method for detecting and measuring a clamping force and/or a braking torque includes encapsulating a fiber-optic strain sensor in a casing and incorporating the casing in a portion of friction material adhering to a base platform of a brake pad, detecting, by the fiber-optic strain sensor, a first strain in a first position of the casing along a first direction and a second strain in a second position of the friction material along a second direction, generating a first photonic signal, representative of the first detected strain, and a (Continued)

second photonic signal, representative of the second detected strain, receiving the first and second photonic signals, by an optical reading/interrogation unit, optically connected to the fiber-optic strain sensor, determining, by the optical reading/interrogation unit, the values of the first and second strains based on the first and second received photonic signals and determining a measurement of the clamping force and/or braking torque based on determined values of the first and second strains.

30 Claims, 12 Drawing Sheets

(51) Int. Cl.
    *G01L 1/24*     (2006.01)
    *G01L 5/00*     (2006.01)
    *G01L 5/166*     (2020.01)
    *F16D 66/00*     (2006.01)

(52) U.S. Cl.
    CPC ........ *G01L 5/166* (2013.01); *F16D 2066/001* (2013.01); *F16D 2066/005* (2013.01); *F16D 2066/006* (2013.01)

(56) References Cited

U.S. PATENT DOCUMENTS

| | | | |
|---|---|---|---|
| 6,111,643 | A | 8/2000 | Discenzo et al. |
| 6,359,690 | B1 | 3/2002 | Discenzo et al. |
| 7,551,268 | B2 | 6/2009 | Discenzo et al. |
| 7,877,216 | B2 | 1/2011 | Wright et al. |
| 9,562,815 | B2 | 2/2017 | Buck et al. |
| 10,385,938 | B2 | 8/2019 | Dohle et al. |

FOREIGN PATENT DOCUMENTS

| | | | |
|---|---|---|---|
| DE | 102013213805 A1 | | 1/2015 |
| DE | 102014112868 B3 | | 3/2016 |
| EP | 0388040 A2 | | 9/1990 |
| EP | 0920092 A2 | | 6/1999 |
| EP | 1243808 A1 | | 9/2002 |
| EP | 2149721 A1 | | 2/2010 |
| JP | H1016761 A | * | 1/1998 |
| JP | 2012078266 A | * | 4/2012 |
| WO | WO-2008091217 A1 | * | 7/2008 ........... F16D 65/092 |

OTHER PUBLICATIONS

Paul Singh, Florian Julich and Johannes Roths; "Polarization dependence of the strain sensitivity of fiber Bragg gratings inscribed in highly birefringent optical fibers"; Photonics Laboratory, Munich University of Applied Sciences, Munich, Germany; 2012 Proceedings of SPIE; Optical Sensing and Detection II, vol. 8439, 84391S-1 to 84391S-7; May 2012; pp. 468-474; DOI: 10.1117/12.922733; SPIE Photonics Europe, Apr. 16-19, 2012; Brussels, Belgium.

* cited by examiner

METHOD AND SYSTEM FOR DETECTING AND MEASURING A BRAKING FORCE OF A BRAKING SYSTEM FOR VEHICLE, BY MEANS OF PHOTONIC SENSORS INCORPORATED IN A BRAKE PAD

CROSS-REFERENCE TO RELATED APPLICATIONS

This application is a National Phase Application of PCT International Application No. PCT/IB2020/055447, having an International Filing Date of Jun. 10, 2020, which claims priority to Italian Application No. 102019000008874 filed Jun. 13, 2019, each of which is hereby incorporated by reference in its entirety.

FIELD OF THE INVENTION

The present invention relates to a method and system for detecting and measuring a clamping force and/or a braking force of a vehicle braking system by means of photonic sensors (i.e., fiber-optic sensors) incorporated in a brake pad.

The present invention further relates to a sensorized brake pad equipped to allow the aforesaid method to be implemented.

PRIOR ART

For controlling, monitoring and actuating a braking system, e.g. an electronically controlled disc brake system, it is very useful to know the clamping force value or the braking torque value (and preferably both) applied by the brake calipers of the braking system during a braking action in real-time and as precisely as possible.

However, it is difficult to measure the clamping force and/or braking torque applied by the brake calipers of the brake system directly, accurately, and reliably.

An option for an indirect, but potentially effective, measurement of the clamping force and/or braking torque could be that of measuring the forces, or other related quantities, acting within a brake pad, belonging to the brake caliper, caused by the action of the brake caliper upon a braking event.

For this purpose, it would be desirable to be able to incorporate force sensors and/or other sensors of other force-related quantities (e.g., strains), capable of detecting and providing such information in the brake pad itself.

However, the force and/or strain sensors made available by the known art are not suitable to be incorporated in the body of the brake pad either because they are not sufficiently miniaturized and compact, or because they cannot be easily connected to the outside for activation and reading, or because they are too sensitive to temperature variations or not robust enough to operate at high temperatures and thus unsuitable to operate in an environment, such as a brake pad, which is subjected to considerable temperature fluctuations.

At least some of the aforesaid drawbacks apply, for example, to the known force and/or strain sensors based on piezo-electric or piezo-resistive phenomena.

Given this, it is possible to attempt to estimate and/or calculate the value of the clamping force and/or braking torque indirectly based on the detection of other quantities, or based on force detections made externally to the brake pad or caliper itself. However, this causes the further drawback deriving from the fact that such an estimate or calculation does not fully meet the required accuracy requirements.

Although the technical field of sensor technology offers a wide range of solutions, the known solutions offer sensors which either cannot be easily incorporated in a brake pad from a practical point of view (because they are either not sufficiently compact or too complex and invasive or not robust enough to temperature) or offer indirect measurements from which it is not possible to obtain the value of clamping force and/or braking torque, let alone both, with sufficient accuracy.

The need thus arises for force sensors or sensors of other quantities (e.g., strains) related to the clamping force and/or braking torque, which are compact, miniaturized and simple to activate/read, such to be suitable to be practically incorporated into the body of a brake pad, without affecting its performance at all, and which at the same time make it possible to determine the clamping force and/or braking torque (and preferably both) applied by the brake caliper in all environmental and operating conditions with high accuracy and reliability, and in real-time during the braking action.

As noted above, such requirements are not fully met by the solutions currently available from the prior art.

SOLUTION

It is an object of the present invention to provide a method for detecting and measuring a clamping force and/or braking torque resulting from the actuation of a friction brake system per vehicle, by means of detection carried out in a brake pad of the brake system, which makes it possible to remedy at least partially the aforesaid disadvantages described with reference to the prior art, and to meet the aforesaid requirements which are particularly felt in the concerned technical field.

This and other objects are achieved by a method for detecting and measuring a clamping force and/or braking torque as described and claimed herein.

It is a further object of the present invention to provide a sensorized brake pad for a brake caliper of a vehicle brake system, equipped in such a way to make it possible to perform the method for detecting and measuring a clamping force and/or braking torque.

These and other objects are achieved by a sensorized brake pad as described and claimed herein.

It is a further object the present invention to provide a brake caliper for a brake system comprising at least one sensorized pad as described and claimed herein.

These and other objects are achieved by a brake caliper as described and claimed herein.

It is a further object of the present invention to provide a system for detecting and measuring a clamping force and/or braking torque, by means of detection carried out in at least one brake pad of the braking system, using at least one of the aforesaid sensorized pads.

This and other objects are achieved by a system for detecting and measuring a clamping force and/or braking torque as described and claimed herein.

It is a further object of the present invention to provide a braking system using at least one of the aforesaid sensorized brake pads or the aforesaid system for detecting and measuring clamping force and/or braking torque.

These and other objects are achieved by a braking system as described and claimed herein.

BRIEF DESCRIPTION OF THE DRAWINGS

Further features and advantages of the method and systems according to the invention will be apparent from the following description of its preferred embodiments, given by way of non-limiting examples, with reference to the accompanying figures, in which.

DETAILED DESCRIPTION OF THE INVENTION

With reference to FIGS. 1-19, hereinafter a method is described for detecting and measuring a clamping force CF and/or a braking torque BT deriving from the actuation of a friction braking system for a vehicle, by means of detection performed in a brake pad 10 of the braking system.

Figure 1:
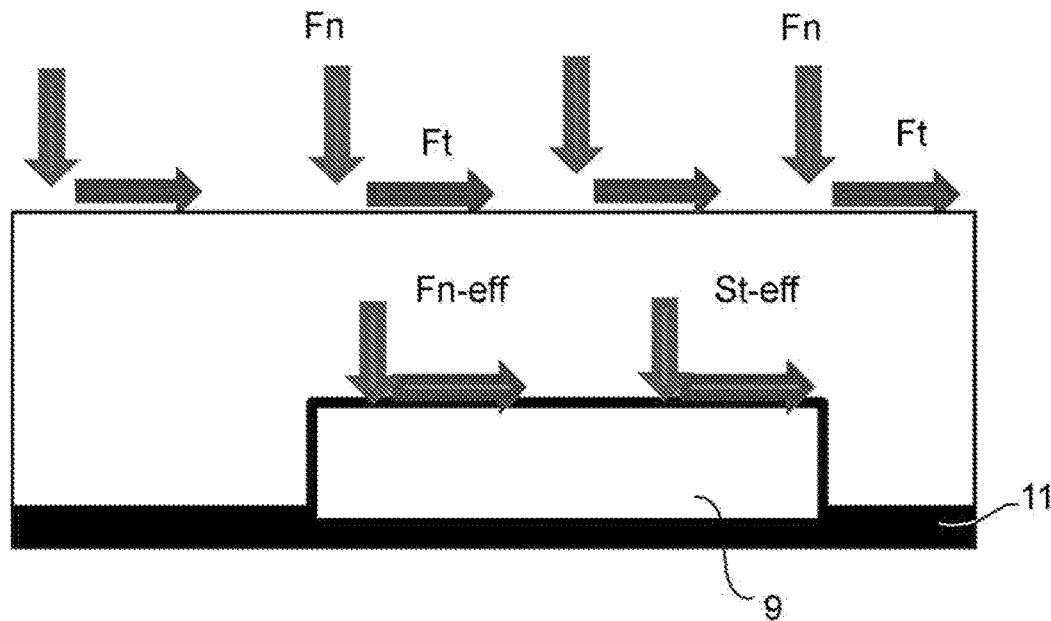
FIGS. 1 and 2 illustrate in a simplified manner some structural and functional aspects of the method and system for detecting and measuring a clamping force and/or braking torque, according to an embodiment of the present invention.
Figure 2:
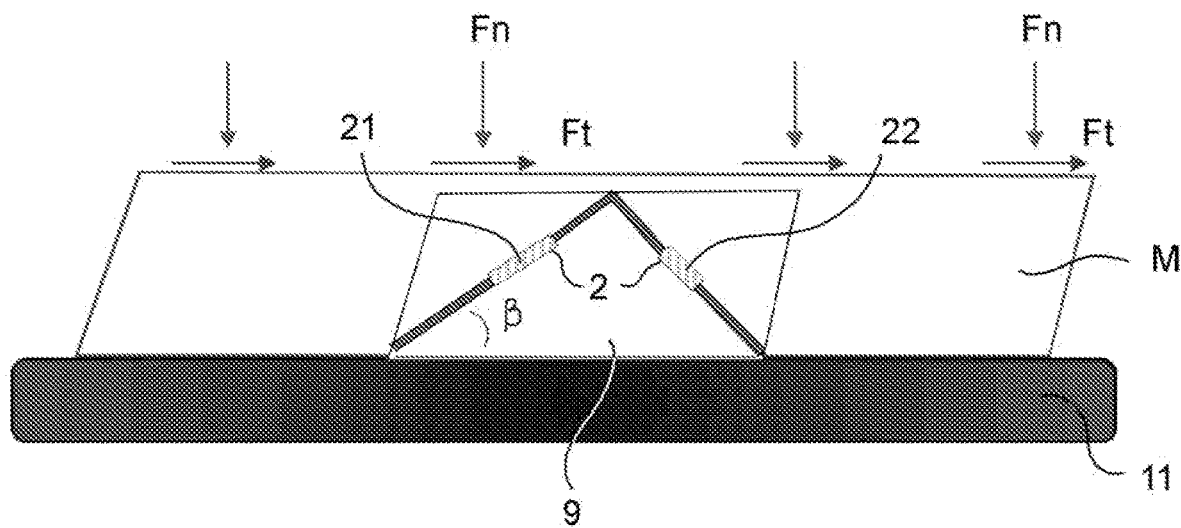
Figure 3:
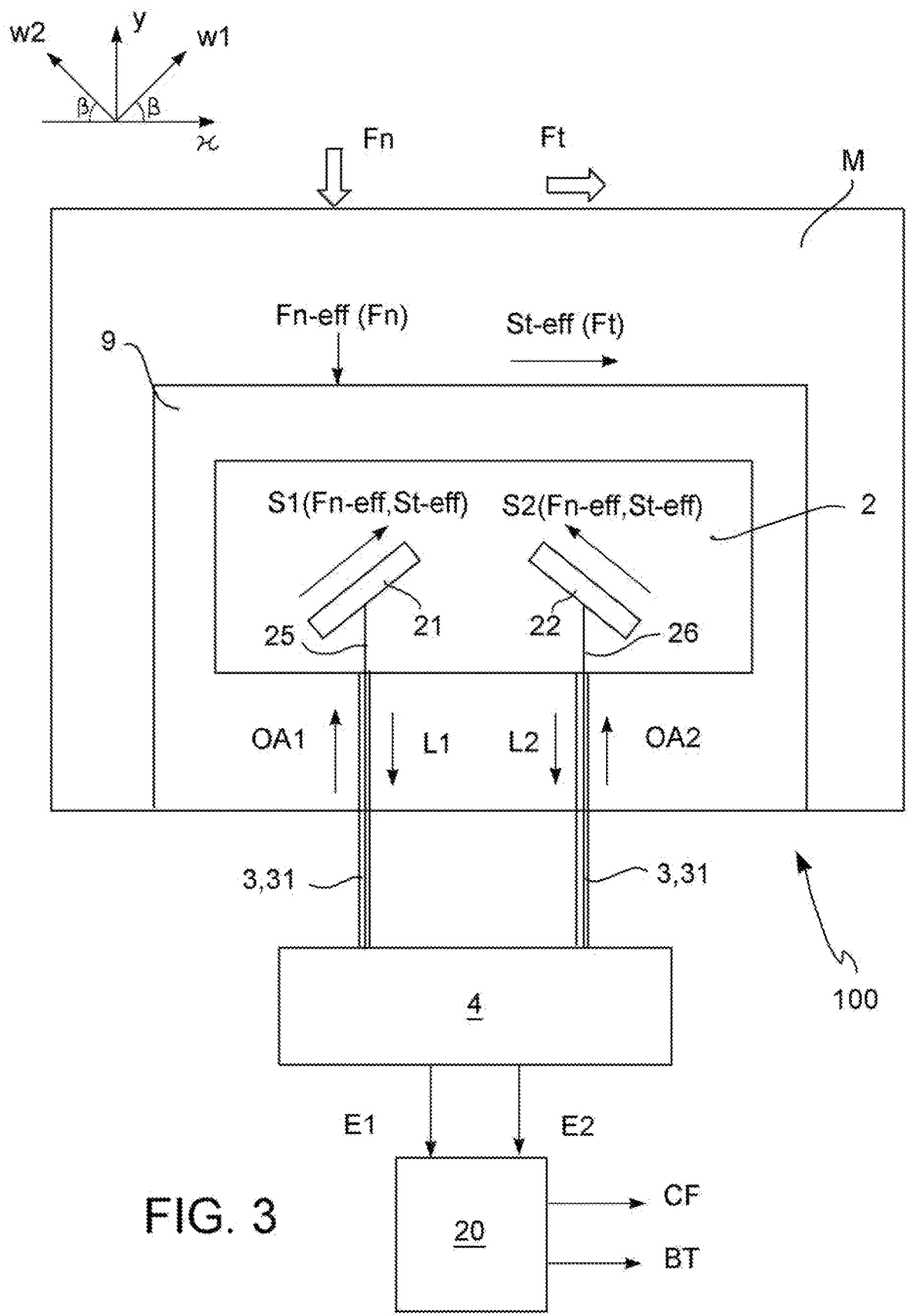
FIG. 3-6 illustrate, by means of function block diagrams, the respective different embodiments of a sensorized brake pad and a system for detecting and measuring a clamping force and/or braking torque, according to the present invention.

With reference, in particular, to FIG. 1-3, the method first comprises the step of encapsulating at least one fiber-optic strain sensor 2 in a casing 9 and of incorporating the aforesaid casing 9 in a respective portion of friction material M adhering to a base plate or platform 11 of the brake pad 10.

Such portion of friction material M is sensitive to friction so that the shearing strain (i.e., the tangential strain) St-eff to which the casing 9 is subject in a tangential reference direction x is representative of the tangential force Ft acting on the brake pad 10, and the normal force Fn-eff to which the casing 9 is subject in a normal reference direction y is representative of the normal force Fn acting on the brake pad 10.

It is worth noting that the tangential and normal reference directions (x, y) refer to the directions of action of the forces acting on the brake pad.

The method then provides detecting, by the aforesaid at least one fiber-optic strain sensor 2, a first strain S1, present in a first position of the casing 9 along a predefined first spatial direction w1; and further detecting, by the aforesaid at least one fiber-optic strain sensor 2, a second strain S2, present in a second position of the casing 9 along a predefined second spatial direction w2.

The at least one fiber-optic strain sensor is configured so that the aforesaid first strain S1 is dependent on both the normal force Fn-eff and the tangential strain St-eff acting on the casing 9, and the aforesaid second strain S2 is dependent on both the normal force Fn-eff and the tangential strain St-eff acting on the casing 9.

As illustrated above, the method thus provides a double detection, each of which includes strain information representative of both the normal force and the tangential component of a force acting in a respective position (and ultimately dependent on the clamping force and/or braking torque applied by the brake caliper).

The method then comprises the steps of generating, by the fiber-optic strain sensor 2, a first photonic signal L1, representative of the first detected strain S1, and a second photonic signal L2, representative of the second detected strain S2; and then receiving the aforesaid first photonic signal L1 and second photonic signal L2, by an optical reading/interrogation unit 4, optically connected to the aforesaid fiber-optic strain sensor 2.

The method finally provides determining, by the optical reading/interrogation unit 4, the value of the first strain S1 and the value of the second strain S2, on the basis of the aforesaid first received photonic signal L1 and second received photonic signal L2, respectively; and determining a measurement of the clamping force CF and/or of the braking torque BT based on the determined values of the first strain S1 and the second strain S2.

According to an embodiment of the method, the aforesaid fiber-optic strain sensor 2 is a sensor of the Fiber Bragg grating type, and the aforesaid predetermined first spatial direction w1 and second spatial direction w2 are directions different from said tangential x and normal y reference directions.

According to possible implementation options, the first spatial direction w1 and the second spatial direction w2 are symmetric with respect to the normal reference direction y, i.e., they form complementary angles with respect to a positive tangential reference direction x.

According to another implementation option (illustrated in FIGS. 2 and 3, and in particular in the reference system illustrated in FIG. 3 at the top right), the angle $\beta$ formed by the first spatial direction w1 with the positive direction of the tangential reference direction x is equal to the angle $\beta$ formed by the second spatial direction w2 with the negative tangential reference direction x.

According to another embodiment of the method, the aforesaid fiber-optic strain sensor 2 is a sensor of the fiber Bragg grating type arranged in a birefringent fiber.

In this case, the predefined first spatial direction w1 coincides with the tangential reference direction x and the aforesaid second spatial direction w2 is a direction perpendicular to the tangential reference direction x.

According to an embodiment of the method (illustrated for example in the FIGS. 2-6), the fiber-optic strain sensor 2 comprises a first sensor element 21 and a second sensor element 22.

The first sensor element 21 comprises a first fiber Bragg grating, arranged in the aforesaid first position, within a first portion of optical fiber arranged to be aligned with the aforesaid first spatial direction w1.

The second sensor element 22 comprises a second fiber Bragg grating, arranged in the aforesaid second position, within a second portion of optical fiber arranged to be aligned with the second spatial direction w2.

According to an implementation option (illustrated in the FIGS. 5 and 6), the aforesaid first sensor element 21 and second sensor element 22 are comprised in a single optical fiber 25.

According to another implementation option (illustrated in the FIGS. 3 and 4), the aforesaid first sensor element 21 and second sensor element 22 are comprised in two different respective optical fibers 25.

According to an embodiment of the method, the step of determining comprises: generating, by the optical reading/interrogation unit 4, a first electrical signal E1 representative of the first photonic signal L1 and a second electrical signal E2 representative of the second photonic signal L2; then, transmitting the aforesaid first electrical signal E1 and second electrical signal E2 to a control unit 20; finally, calculating the clamping force CF and/or braking torque BT, by a processor of the control unit 20 by means of one or more algorithms executed by one or more software programs, on the basis of the aforesaid first electrical signal E1 and second electrical signal E2.

According to an implementation option of the method, the aforesaid step of calculating comprises calculating the braking torque measurement BT based on a differential strain ΔS given by the difference between the determined values of the first strain S1 and of the second strain S2, through a proportionality coefficient depending on geometric parameters relating to the arrangement of the sensors with respect to the reference directions x, y, on geometric parameters relating to the pad and the positioning of the sensor in the pad, and on parameters representative of friction coefficients of the materials of which the casing and the friction material are made.

For example, the aforesaid step of calculating may be based on the following ratio between differential effort ΔS and braking torque BT:

$$\Delta S = \frac{k_{t,eff}\left(\frac{E_{HM}}{E_{FM}}, v\right)}{\left(\tan(\beta) + \frac{1}{\tan(\beta)}\right) \cdot r \cdot k_{geom}} \cdot BT$$

wherein:

β=angle with sensor directions w1, w2;

v=Poisson's ratio of the casing material;

$k_{geom}$=constant dependent on pad geometry;

r=effective radius of the sensor position;

$E_{HM}$=Young's modulus of the casing material;

$E_{FM}$=Young's modulus of the friction material;

$$k_{t,eff}\left(\frac{E_{HM}}{E_{HM}}\right) = \text{characteristic coefficient,}$$

function of the friction materials and casing.

According to an embodiment of the method, the step of calculating comprises calculating the clamping force CF, i.e., the normal pressure acting on the brake pad, on the basis of a normal force or pressure (for example Fn-eff) acting on the casing, incorporated in the brake pad.

The aforesaid normal force or pressure acting on the casing Fn-eff is calculated on the basis of the detected first strain S1 and/or of the detected second strain S2, through a proportionality coefficient dependent on geometric parameters relative to the arrangement of the sensors with respect to the reference directions x, y and on the Young's modulus of the friction material.

For example, the aforesaid step of calculating may be based on the following relationship between the mean of the calculated strains (S1 and S2) and the clamping torque CF:

$$\overline{S} = \frac{S_1 + S_2}{2} = \frac{k_1(v, \beta)}{A \cdot E_{HM}} \cdot CF$$

where β=angle of directions of sensors w1, w2; A=pad equivalent area; v=Poisson's coefficient of the casing material; $E_{HM}$=Young's modulus of the casing material; $k_1(v,\beta)$=characteristic coefficient of the system.

According to an embodiment (illustrated for example in FIGS. 4-6), the method comprises the further steps of encapsulating a fiber-optic temperature sensor 5 in the casing 9, in a third position arranged near the aforesaid first and second positions; then detecting, by means of the fiber-optic temperature sensor 5, the temperature present in the third position T, and generating a third photonic signal LT representative of the detected temperature; then, receiving the aforesaid detected third photonic signal LT by the optical reading/interrogation unit 4, optically connected to said fiber-optic strain sensor 5; and determining, by the optical reading/interrogation unit 4, a temperature value T, on the basis of the third received photonic signal LT.

In this case, the step of determining a measurement of the clamping force CF and/or of the braking torque BT comprises determining a measurement of the clamping force CF and/or of the braking torque BT based on the values of the first strain S1 and of the second strain S2 and of the determined temperature value T.

According to an implementation option, the fiber-optic temperature sensor 5 is a fiber Bragg Grating fiber-optic temperature sensor.

Figure 5:
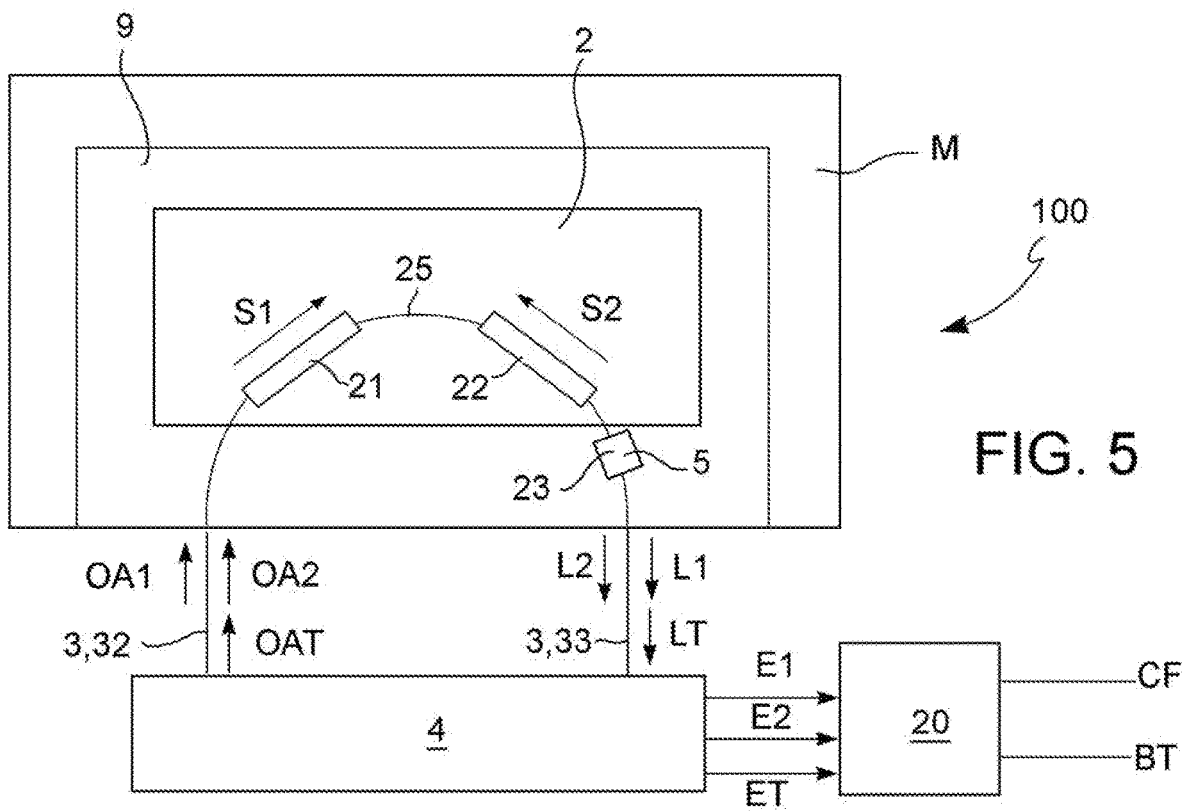
Figure 6:
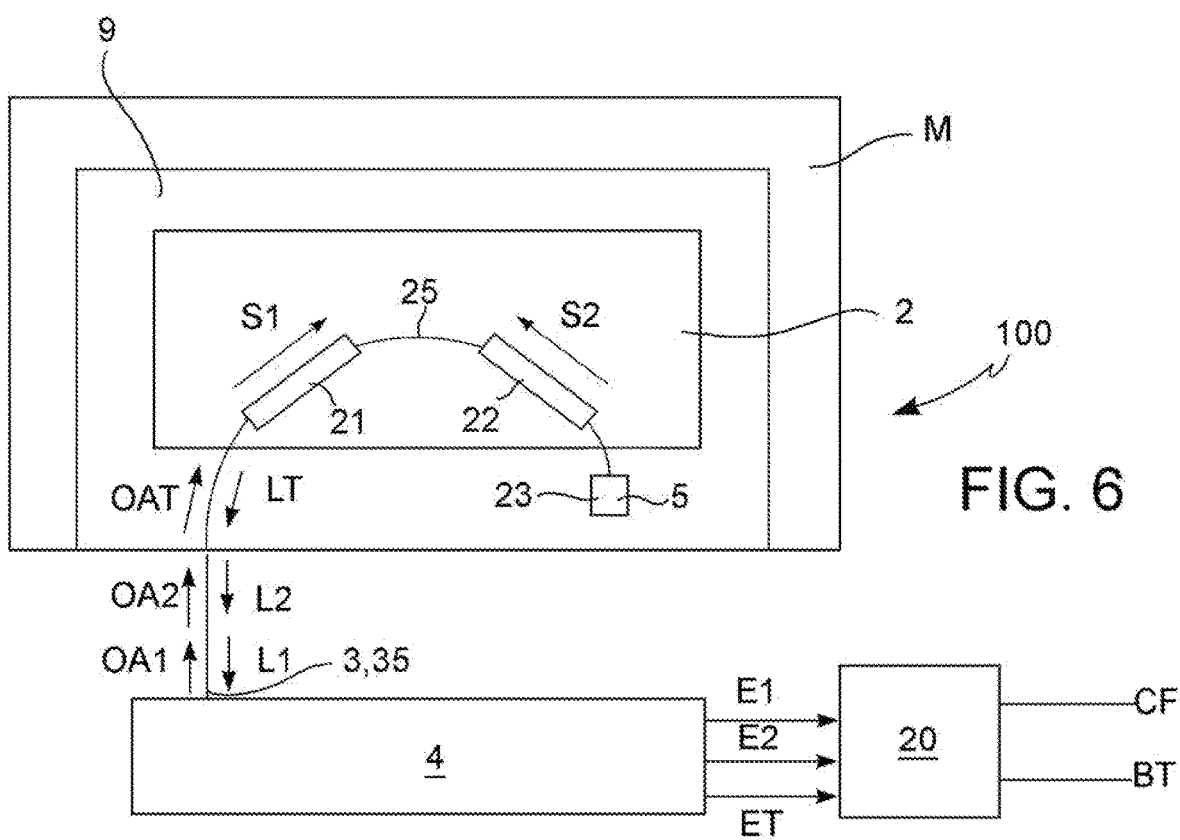
Figure 7A:
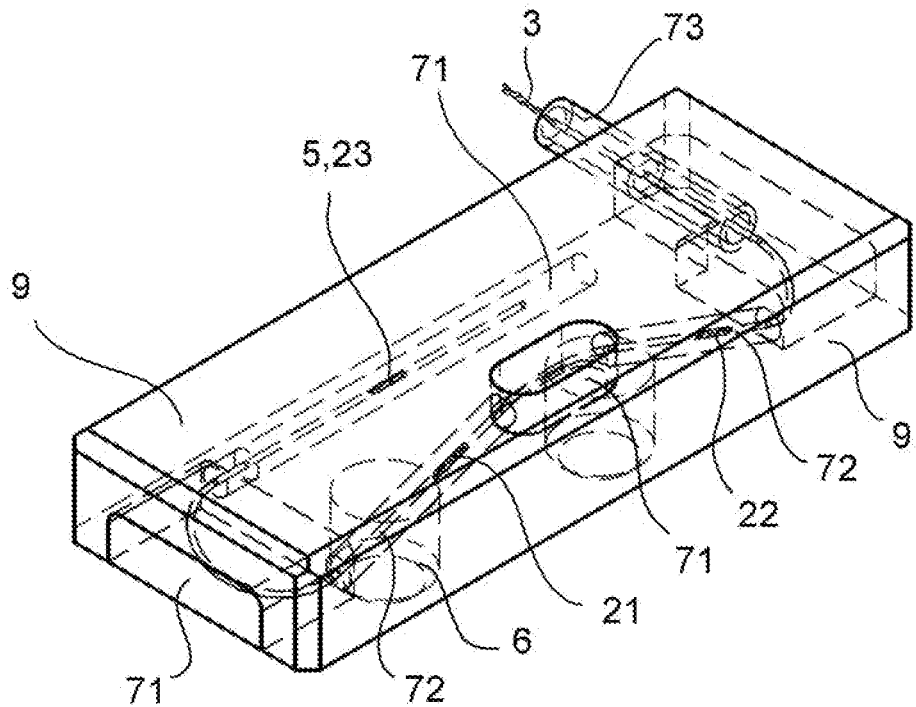
FIGS. 7A, 7B, 8A, 8B are details of the respective implementation options of a pre-formed casing containing the sensors adapted to be incorporated in a sensorized pad according to particular embodiments of the invention.
Figure 7B:
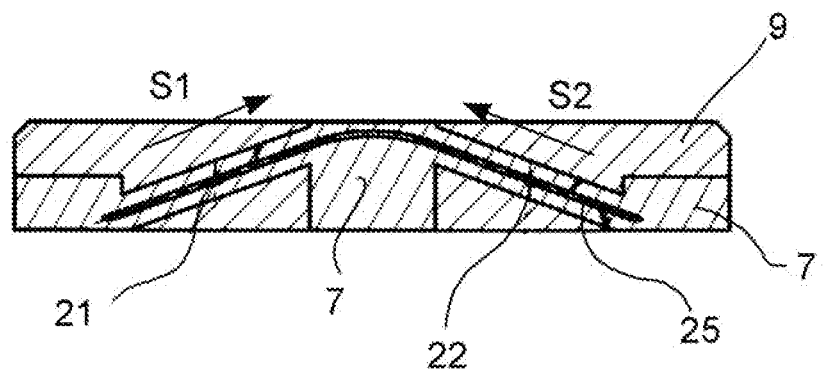

According to a preferred implementation option, the aforesaid fiber-optic strain sensors and temperature sensor are mutually integrated. More specifically, if the two FBG strain sensors are comprised in the same optical fiber 25, the aforesaid temperature sensor is also comprised in the same optical fiber 25 (as illustrated in FIGS. 5, 6, and 7A).

For example, the fiber-optic temperature sensor comprises a third sensor element 23 which includes a third fiber Bragg grating, obtained in the optical fiber containing the first sensor element 21 and the second sensor element 22; such third Bragg grating in the optical fiber is assembled in the casing in an appropriate cavity and/or a capillary tube 71 so as not to be affected by thermal expansion and deformation of the material in which it is placed.

Figure 4:
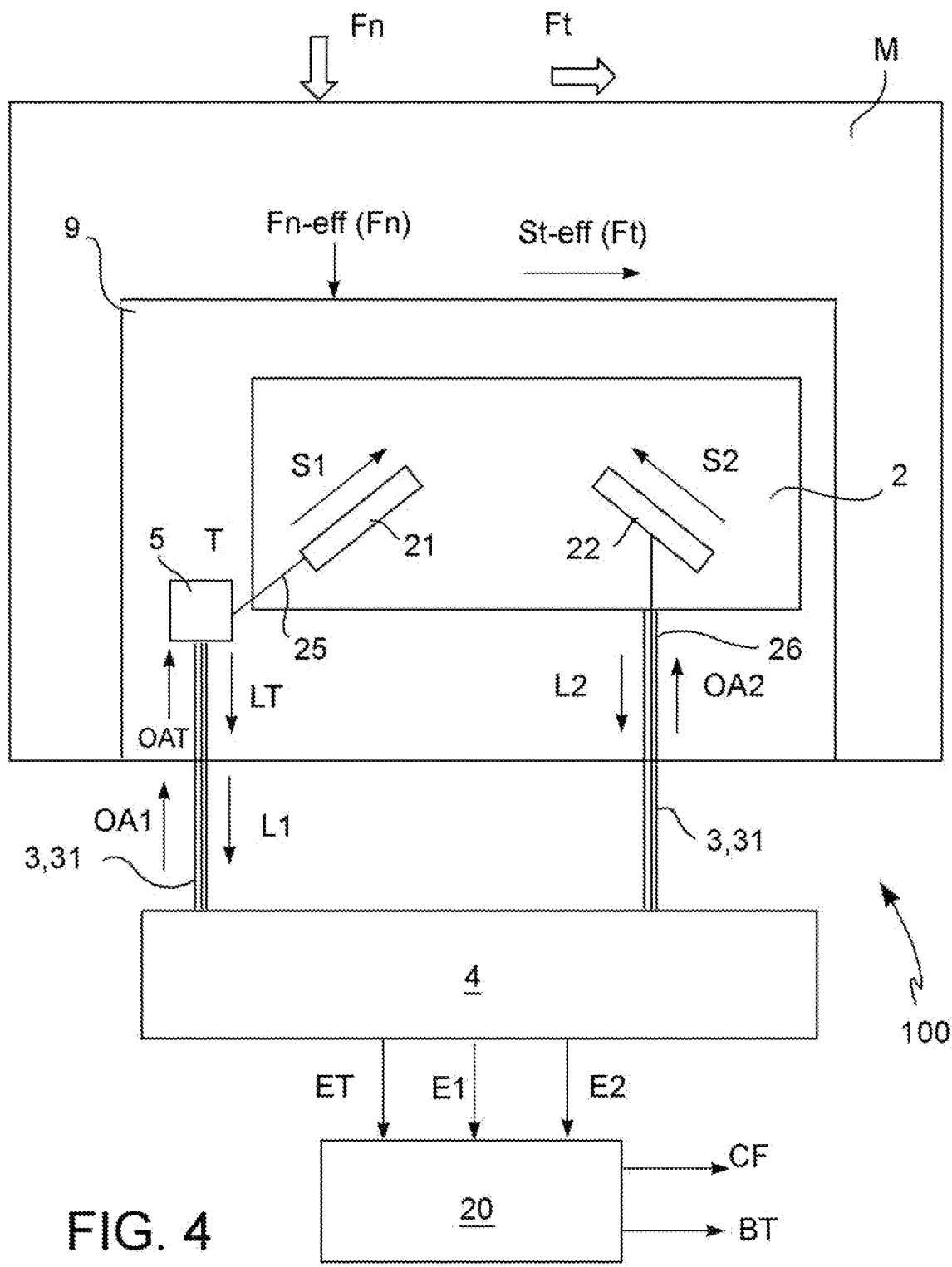

According to another implementation option, if the two strain sensors FBG are comprised in two different optical fibers, the temperature sensor comprises a third fiber Bragg grating made in one of the two fibers containing the first or second fiber Bragg grating of the strain sensor, in a third position distinct from the first or second position, and placed outside the casing, and thus in the friction material, or arranged in a stretch of fiber contained in the casing (as illustrated in FIG. 4). In both cases, such third fiber Bragg grating is inserted into a cavity of the casing or in a capillary tube 71 which isolates it from possible thermal expansion and deformation phenomena of the material in which it is encapsulated.

According to another implementation option (not shown in the figures), the fiber-optic temperature sensor comprises a third sensor element 23 which includes a third fiber Bragg grating, made in a dedicated fiber optic, additional with respect to the optical fiber containing the first sensor element 21 and the second sensor element 22; such third Bragg grating in the dedicated optical fiber is assembled in the casing in an appropriate cavity and/or a capillary tube 71 so as not to be affected by thermal expansion and deformation of the material in which it is placed.

The aforesaid fiber Bragg grating optical sensors (hereinafter also referred to as "FBG sensors") are sensors of the type illustrated below.

It is known that an FBG sensor is a very sensitive and versatile optical device for measuring various physical parameters, including strain and temperature. In its simplest form, an FBG sensor is obtained by means of a spatially periodic modulation of the refractive index inscribed in the core of the optical fiber (which can be obtained, for example, through the phenomenon of photo-sensitivity or using femto-second light pulses).

The FBG sensors exploit the presence of a resonant condition which reflects the incident light at the so-called "Bragg wavelength" $\lambda_B$, defined as $\lambda_B = 2n_{eff}\Lambda$, where $n_{eff}$ is the effective refractive index of the fundamental mode of the optical fiber and $\Lambda$ is the spatial pitch (periodicity) of the grating.

The operating principle of FBG sensors is based on the property that any change in the effective refractive index or in the grating pitch, caused by external effects, such as strain or temperature, results in a respective shift $\Delta\lambda_B$ of the operating wavelength (Bragg wavelength) which can be derived from formula [1]:

$$\frac{\Delta\lambda_B}{\lambda_B} = k\varepsilon + \alpha_T \Delta T$$

where $\Delta\lambda_B = \lambda - \lambda_B$ is the Bragg wavelength variation with respect to the reference Bragg wavelength $\lambda_B$, k is a scale factor and $\alpha_T$ is the thermo-optical coefficient; the Bragg wavelength shift is linearly dependent on the longitudinal strain $\varepsilon$ with a sensitivity value of about 1.2 pm/µε and temperature change with a sensitivity value of about 11 pm/° C. for silicon fibers in the range of 1550 nm.

As indicated above, it is appropriate to compensate the strain results obtained by FBG sensors with respect to temperature changes under the operating conditions of the FBG sensor (2) incorporated in the casing. Such compensation can be made by developing the aforesaid equation [1] as:

$$\frac{\lambda - \lambda_B}{\lambda_B} = k(\varepsilon_M + \varepsilon_T) + \alpha_T \Delta T = k(\varepsilon_M + \alpha_{SP} \Delta T) + \alpha_T \Delta T$$

where $\varepsilon = \varepsilon_M + \varepsilon_T$ includes two contributions, one due to pure mechanical strain, and a further contribution induced by thermal expansion $\varepsilon_T$ ($\alpha_{SP}$ is the thermal expansion coefficient of the material). Indicating with $\lambda_B$ and $T_0$ the reference Bragg wavelength and reference temperature, and with $\lambda$ and $T$ the real-time values of the wavelength and temperature can be written:

$$\frac{\Delta\lambda_B}{\lambda_B} = k(\varepsilon_M + \varepsilon_T) + \alpha_T(T - T_0)$$
$$= k[\varepsilon_M + \alpha_{SP}(T - T_0)] + \alpha_T(T - T_0)$$

from which the pure mechanical effort can be obtained $\varepsilon_M$ as:

$$\varepsilon_M = \frac{1}{K}\left(\frac{\lambda - \lambda_B}{\lambda_B}\right) - \alpha_{SP}(T - T_0) - \frac{\alpha_T}{K}(T - T_0).$$

The real-time temperature value (to be entered in the formula above to obtain the compensated value of $\varepsilon_M$) is obtained through the additional FBG sensor (i.e., temperature sensor 5), which may be enclosed in a loose tube placed near the FBG strain sensor 2.

In particular, according to an implementation option of the method, the step of determining a measurement of the clamping force CF and/or of the braking torque BT comprises: calculating a strain value due to a thermal variation, on the basis of the determined temperature value; subtracting the strain value due to a thermal variation from the overall measured value of the first strain, in order to obtain a first effective strain value, dependent only on mechanical effects; subtracting the strain value due to a thermal variation from the overall measured value of the second strain, in order to obtain a second effective strain value, dependent only on mechanical effects; determining a measurement of the braking force and/or of the braking torque on the basis of the first effective strain and of the second effective strain values.

The FBG sensors are "passive" sensors, meaning that they do not need to be powered, but are activated by illumination, i.e., by sending an optical activation radiation, at an appropriate wavelength (e.g., the Bragg wavelength), in the fiber optic section in which the grating in the sensor is contained. In response to this, the FBG sensor either reflects or transmits an optical (i.e., photonic) signal, which depends not only on the incident radiation but also on the strain implementation to which the grating itself is subjected. Such photonic signal can be, in different implementation options of the method which will be illustrated below, a transmitted optical signal (i.e., optical spectrum) or a reflected optical signal (i.e., optical spectrum).

According to an embodiment of the method, the fiber-optic strain sensor 2 and/or the fiber-optic temperature sensor 5 are connected to the optical reading/interrogation unit 4 by means of a connection optical interface 3.

According to an implementation option, each connection between each fiber in which the fiber Bragg grating type sensors are obtained and a respective connection optical fiber to the optical reading/interrogation unit is made by means of a fiber splice or a detachable photonic connection element (optical connector).

According to an implementation option, the aforesaid first photonic signal L1 comprises a first optical spectrum either reflected or transmitted by the first sensor element 21, which reaches the optical reading/interrogation unit 4 by means of the connection optical interface 3.

According to an implementation option, the aforesaid second photonic signal L2 comprises a second optical spectrum either reflected or transmitted by the second sensor element 22, which reaches the optical reading/interrogation unit 4 by means of said connection optical interface 3.

According to an implementation option, the aforesaid third photonic LT signal comprises a third optical spectrum either reflected or transmitted by the third sensor element 23, which reaches the optical read/interrogation unit 4 by means of the optical connection interface 3 (which, in an implementation option, is the same optical fiber in which the fiber-optic temperature sensor is found, together with one or both FBG fiber-optic strain sensors, which extends outwards forming the optical interface; or, in another implementation option, it can be another optical fiber connected to the aforesaid optical fiber containing the sensors).

According to an embodiment of the method, the optical reading/interrogation unit 4 is configured to activate each of said first 21 and/or second 22 and/or third 23 sensor element by transmitting an optical activation radiation OA or a respective optical activation radiation (OA1, OA2, OAT) through the connection optical interface 3.

According to an embodiment (illustrated for example in the FIGS. 5 and 6), applicable if the plurality of sensor elements 21, 22 are made in a same fiber, and each of the respective fiber Bragg gratings is associated with a respective different central operating wavelength ($\lambda 1$, $\lambda 2$), the method comprises the further step of transmitting, by the optical reading/interrogation element 4, through the connection optical interface 3, the respective optical activation radiation OA1, OA2 to the plurality of sensor elements 21, 22, centered at the respective operating wavelengths $\lambda 1$, $\lambda 2$, by means of wavelength-division multiplexing (WDM) transmission techniques; and comprises the first step of receiving, through the connection optical interface 3, and distinguishing the respective optical spectra either reflected or transmitted by each of the plurality of sensor elements 21, 22 by means of de-multiplexing using wavelength-division multiplexing (WDM) techniques. According to an implementation of the method (illustrated for example in FIG. 3), applicable if a plurality of sensor elements are made in a same fiber, and the photonic signals emitted by the sensors comprise transmitted optical spectra, the connection optical interface 3 comprises an input connection optical fiber 32 shared by the first OA1 and/or second OA2 optical activation radiation, wavelength-multiplexed, and an output connection optical fiber 33 shared by the transmitted optical spectra which form the first L1 and/or second L2 and/or third photonic signal, wavelength-multiplexed.

According to an embodiment (illustrated for example in the FIGS. 5 and 6), applicable if the plurality of sensor elements 21, 22 and 23 are made in a same optical fiber 25, each of the respective fiber Bragg gratings is associated with a respective different central operating wavelength ($\lambda 1$, $\lambda 2$, $\lambda T$), the method comprises the further step of transmitting, by the optical reading/interrogation element 4, through the connection optical interface 3, the respective optical activation radiation OA1, OA2, OAT to the plurality of sensor elements 21, 22, 23 centered at the respective operating wavelengths $\lambda 1$, $\lambda 2$, $\lambda T$, by means of wavelength-division multiplexing (WDM) transmission techniques; and comprises the further step of receiving, through the connection optical interface 3, and distinguishing the respective optical spectra either reflected or transmitted by each of the plurality of sensor elements 21, 22, 23 by means of de-multiplexing using wavelength-division multiplexing (WDM) techniques.

According to an implementation of the method (illustrated for example in FIG. 6), applicable if a plurality of sensor elements are made in a same fiber and the photonic signals emitted by the sensors comprise reflected optical spectra, the connection optical interface 3 comprises a connection optical fiber 35 shared by the first OA1 and/or second OA2 and third OAT optical activation radiation, wavelength-multiplexed, and by the reflected spectra which form the first L1, second L2 and third LT photonic signal, wavelength-multiplexed.

According to another implementation option of the method (not illustrated in the figures), the connection optical interface 3 comprises one or more connection optical fibers (31, 34), each dedicated to a respective optical activation radiation, between the aforesaid first OA1, second OA2 and/or third OAT optical activation radiation, and a reflected optical spectrum which forms a respective photonic signal, between the aforesaid first L1 and/or second L2 and/or third LT photonic signal.

According to a particular variant of embodiment, each connection between a fiber in which fiber Bragg gratings are obtained and a respective connection optical fiber to the optical reading/interrogation unit is made by means of a fiber splice or a detachable photonic connection element.

According to an implementation of the method, the casing 9 is made of polymeric or mineral material, is distinct from the brake pad 10 and can be fixed and/or incorporated into it, has predetermined geometry and dimensions and is adapted to house at least one fiber-optic strain sensor 2 and fiber-optic temperature sensor 5, and at least one portion of the optical connection interface 3.

In this case, the step of encapsulating includes embedding the at least one fiber-optic strain sensor 2 in the casing 9, and moreover incorporating said casing 9 in the brake pad 10 and/or fixing it to the brake pad 10, during the manufacturing of the brake pad, in a fixed and predefined position, in the aforesaid portion of friction material M.

According to an implementation option, the step of embedding the at least one fiber-optic strain sensor 2 in the casing 9 comprises incorporating, by means of an adhesive 7, the one or more optical fibers 25, 26, containing the fiber-optic sensors 2, 5, in given portions 71 of the casing 9, adapted to orient the optical fibers in the correct position and route them.

The method then comprises the steps of embedding, by means of an adhesive 7, inside specific casing portions 71 of the casing 9, one or more connection fibers of the optical interface 3 in a capillary connection tube 73 exiting from the casing 9 and adapted to be routed on the brake pad by means of a capillary tube or frame structure 75 towards a collector 74 fixed to the brake pad and connectable to a protective output tube of the optical connection interface 30 external to the brake caliper and connectable to the reading/interrogation unit 4.

Figure 8A:
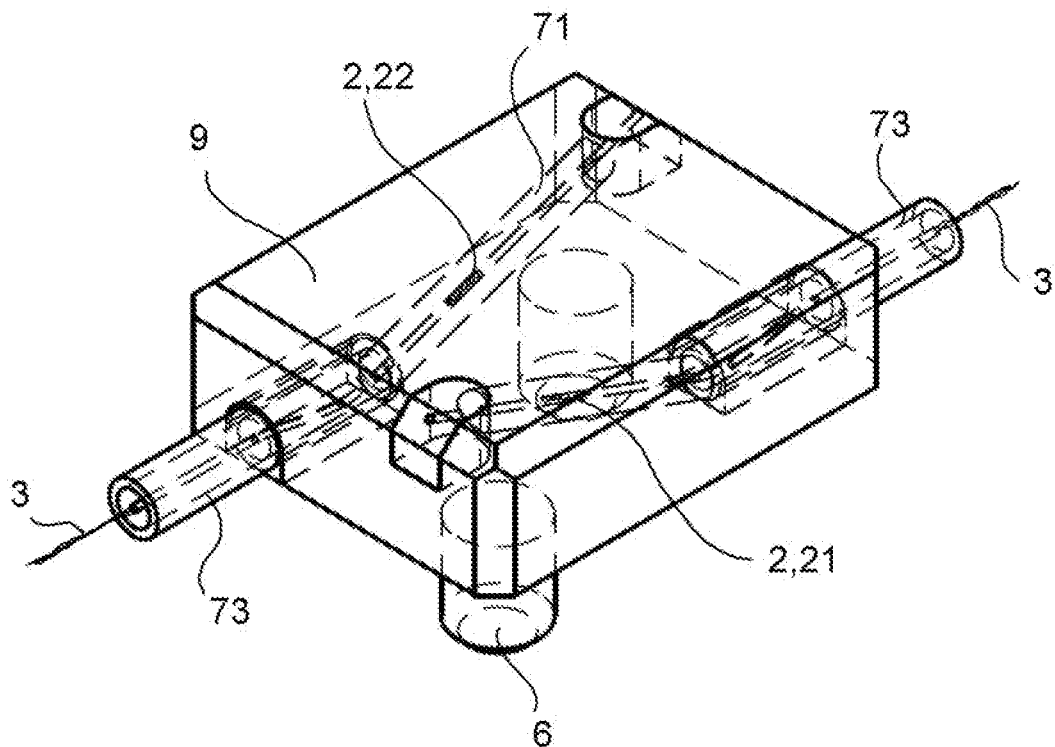
Figure 8B:
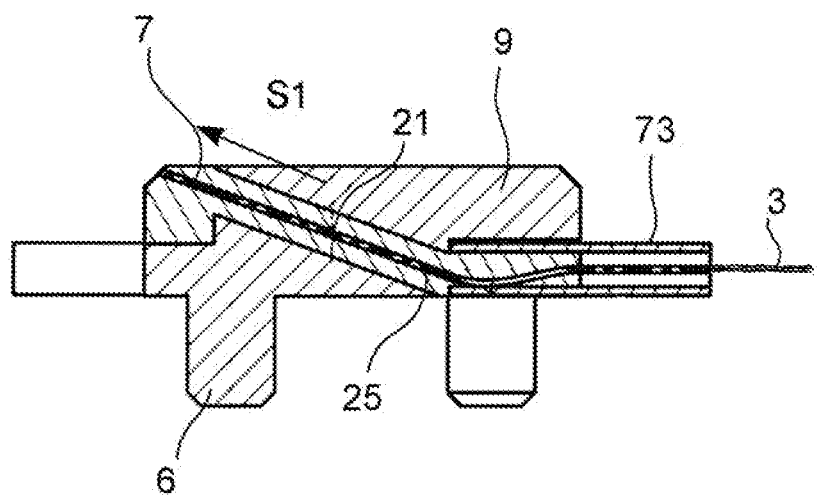

FIGS. 7A and 8A (and the respective enlarged details in FIGS. 7B and 8B) illustrate two possible embodiments of the incorporation of strain sensors 2 in the casing 9, by means of an adhesive 7 and inside specific cavities 71 in the casing 9 and also the capillary connection tube 73.

Figure 9:
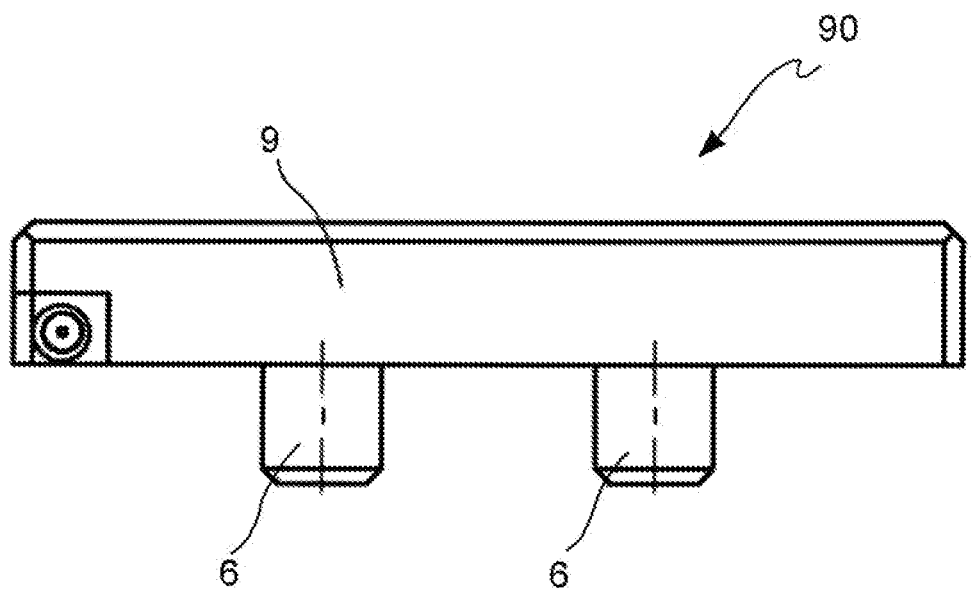
FIG. 9 is a side view of a sensorized brake pad according to an embodiment of the invention.
Figure 10:
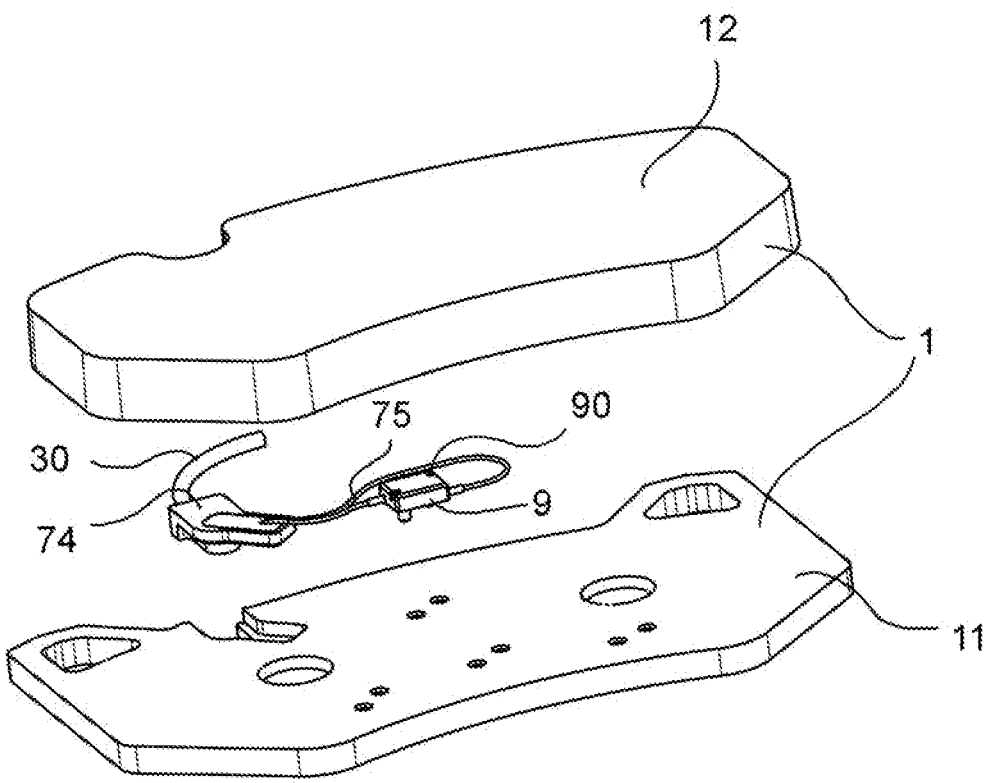
FIGS. 10-14 illustrate respective further embodiments of the sensorized brake pad and show, in particular, possible positions of the sensor in the brake pad according to different implementation options.

In the aforesaid embodiment, the casing 9, containing the aforesaid at least one fiber-optic strain sensor 2, fixed by means of an adhesive 7 inside appropriate portions 71 and the capillary connection tube 73 form a detection element 90 (illustrated in FIG. 9).

Figure 11:
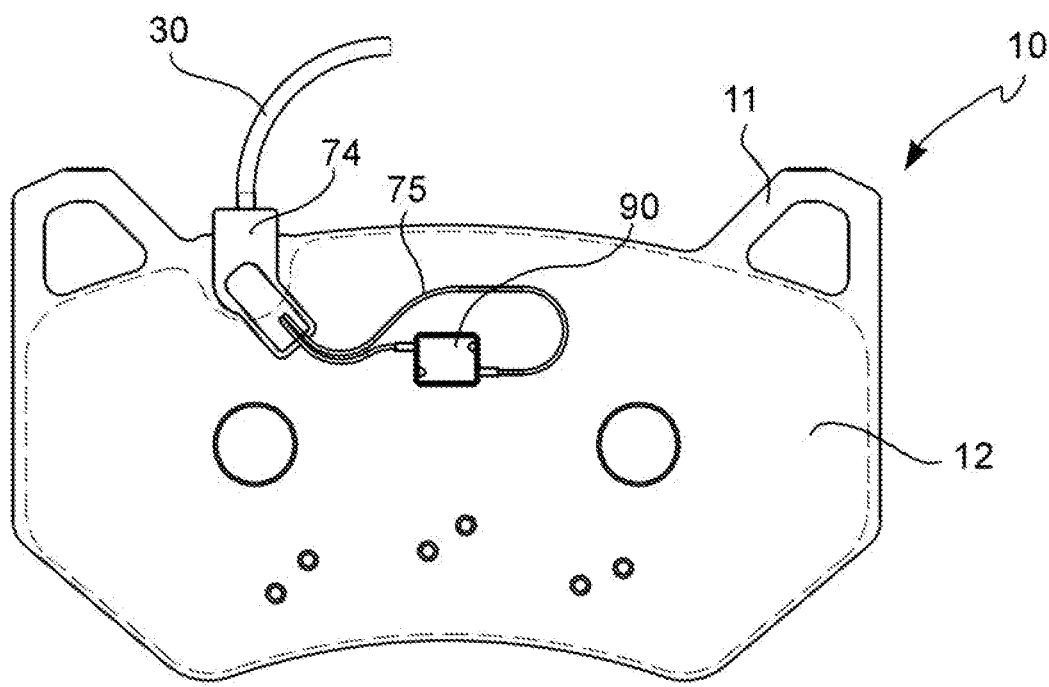
Figure 12:
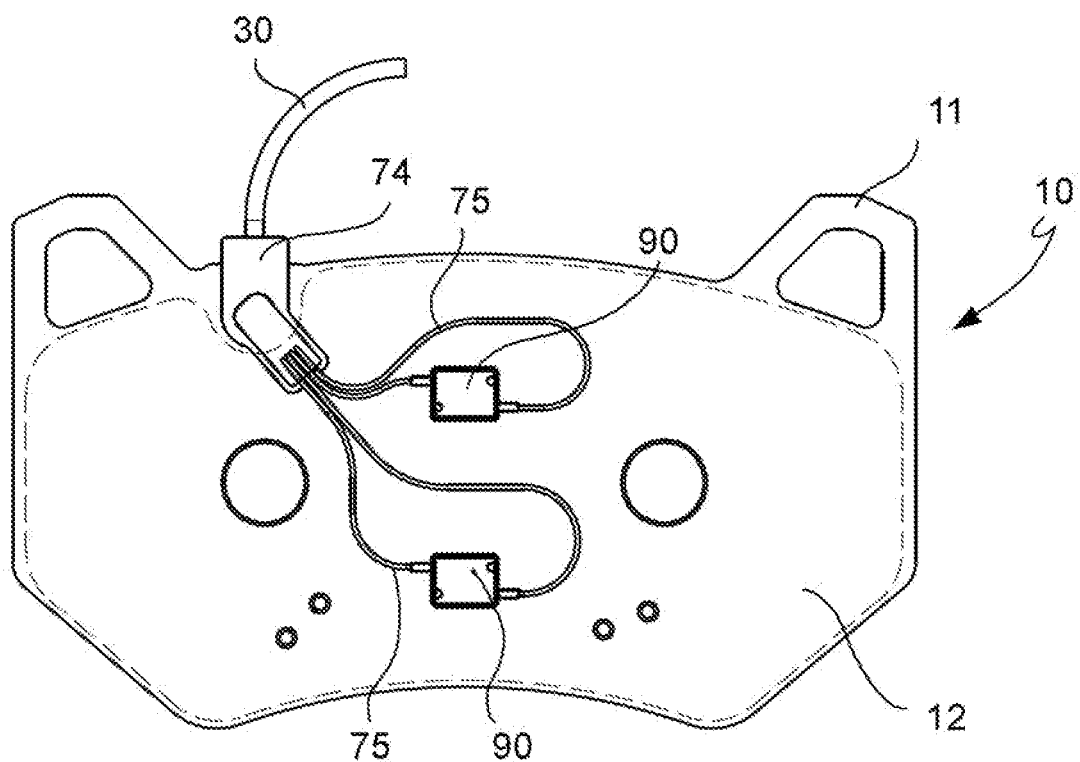
Figure 13:
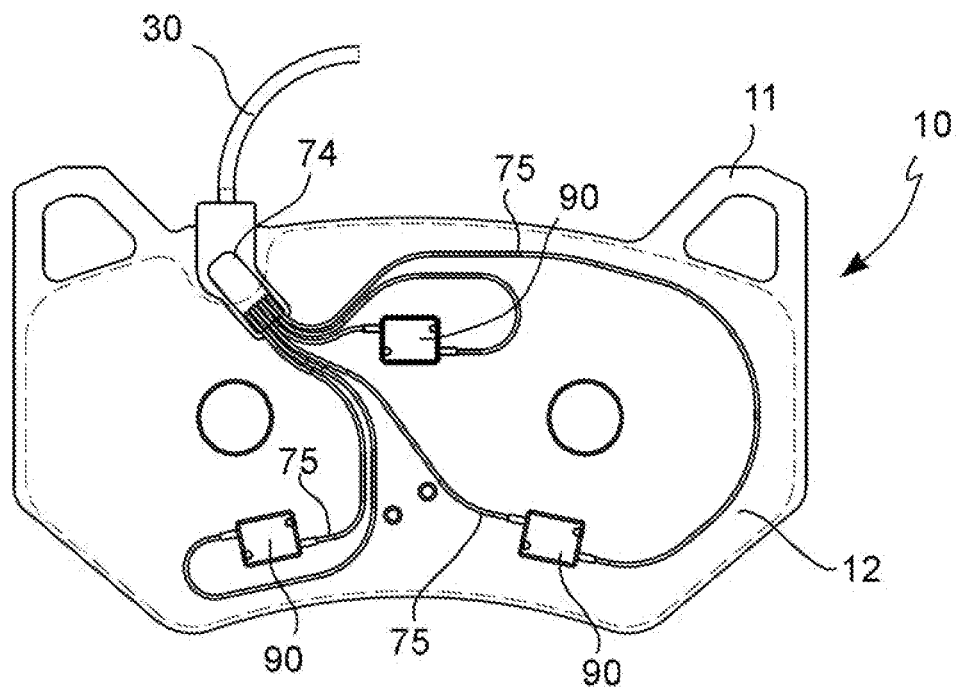

In the FIGS. 10-13, detection elements 90, the collector 74 and the frame 75 are illustrated in several examples of sensorized brake pads. FIGS. 11-13 refer to implementation options of brake pads which incorporate one, two, and three detection elements 90 (each with a respective frame 75), respectively.

Figure 14:
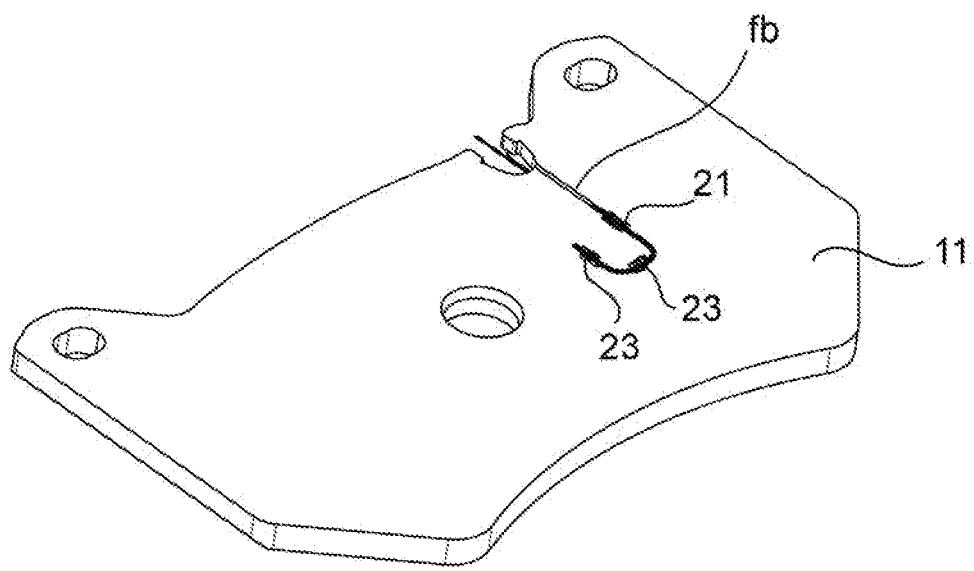
Figure 15:
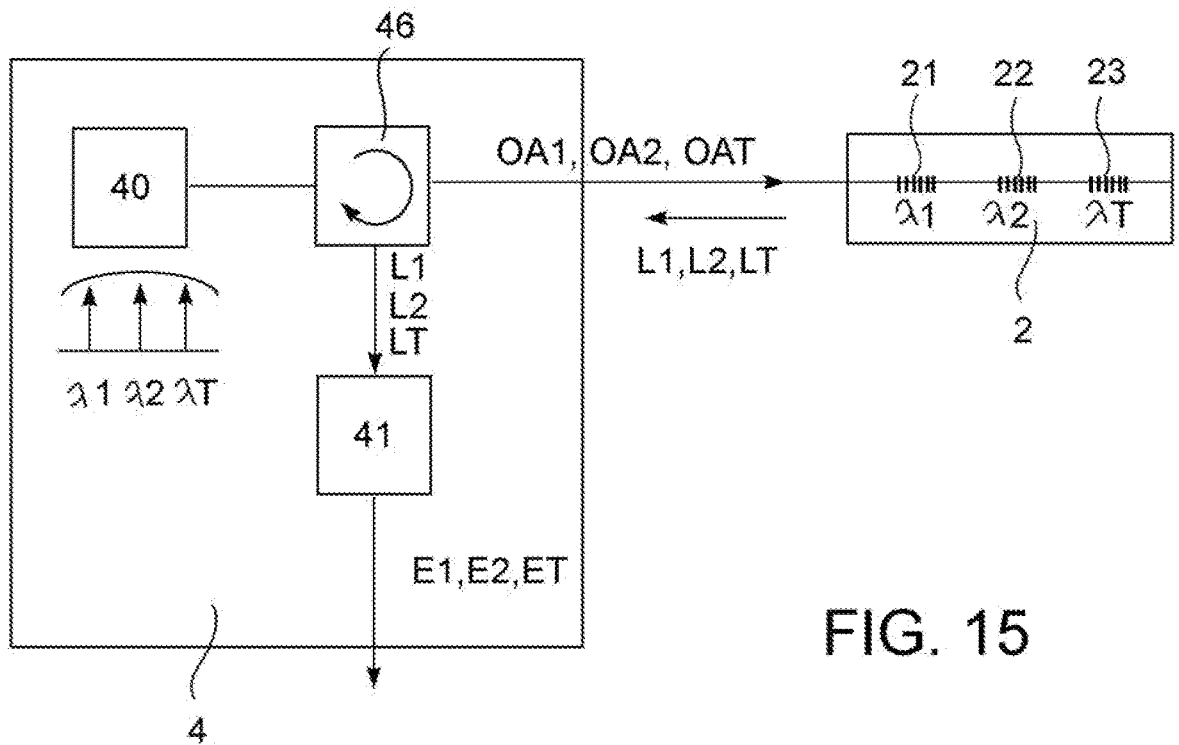
FIGS. 15-18 are functional block diagrams of respective implementation options of an optical reading/interrogation unit comprised in the aforesaid system for detecting and measuring a clamping force and/or braking torque.
Figure 16:
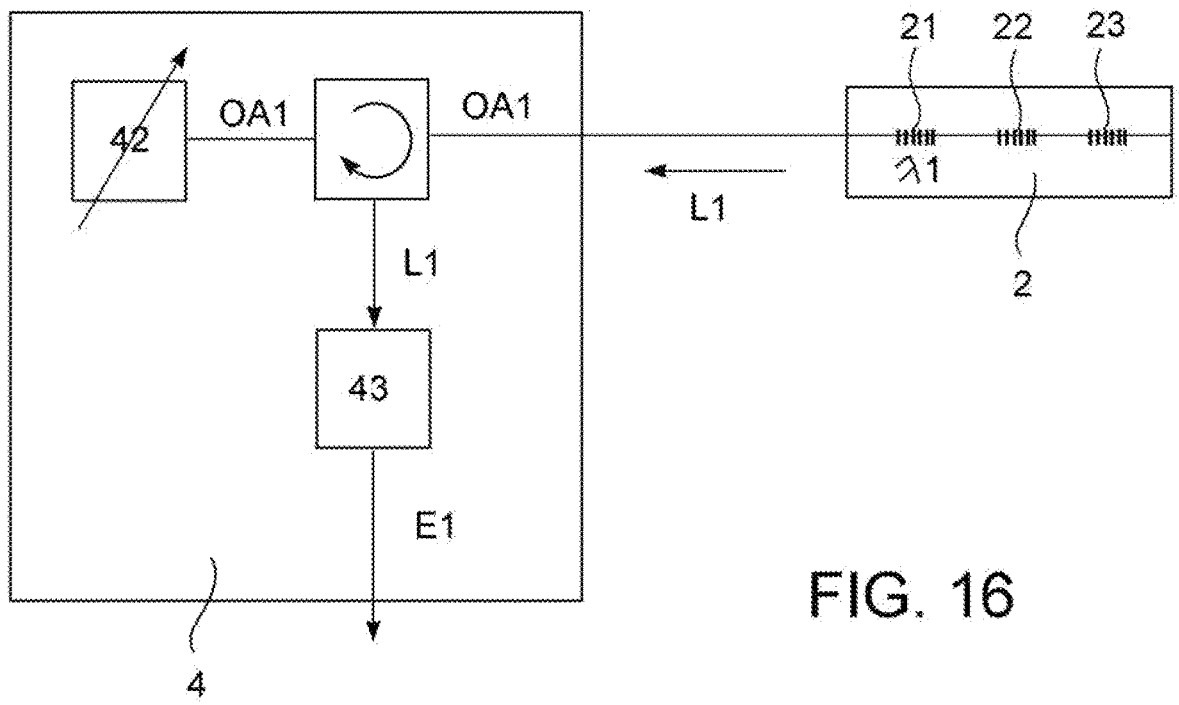
Figure 17:
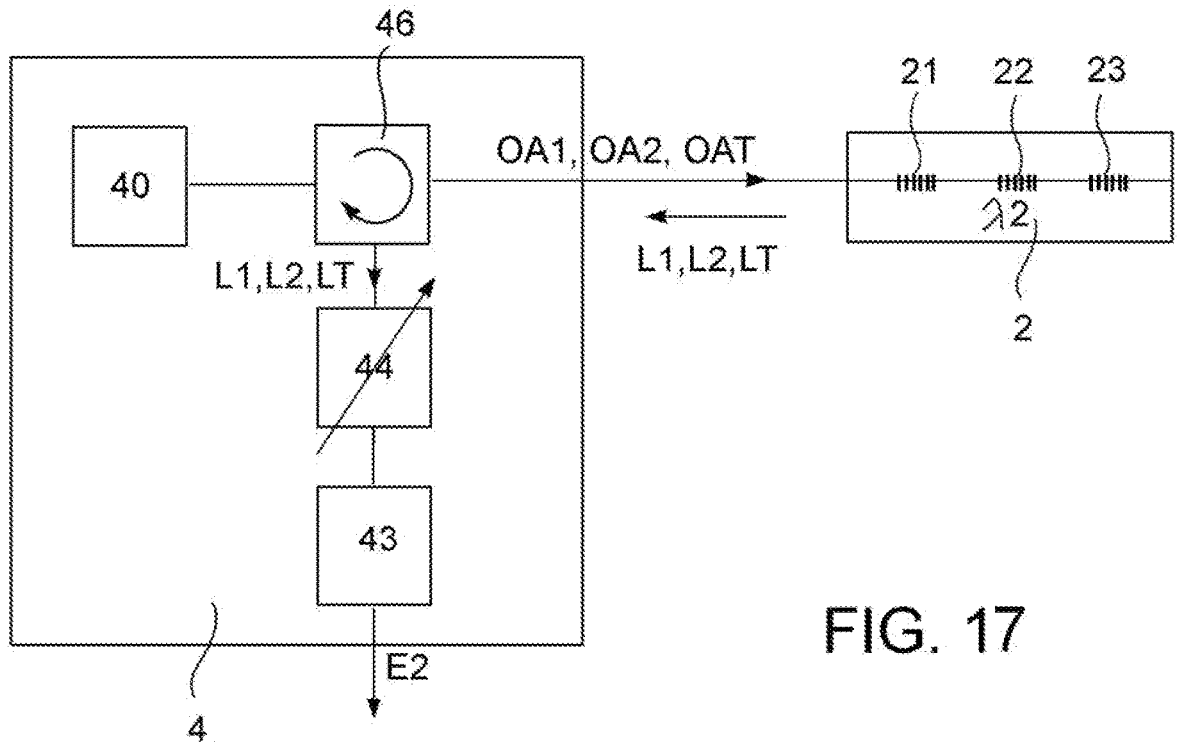

FIG. 14 illustrates structural aspects of the incorporation of a detection element 90 in the embodiment with birefringent fiber fb.

According to different possible implementation options, the casing 9 is made of mineral and/or plastic and/or polymer material and/or resin compound.

According to possible implementation options, the casing (or housing) 9 has a substantially parallelepiped shape, and dimensions of several tens of millimeters, or a few millimeters.

According to a specific implementation example, the casing 9 has dimensions equal to or not exceeding 20 mm base width, 12 mm base height, and 4 mm thickness.

According to an implementation option, the aforesaid step of encapsulating comprises incorporating the at least one fiber-optic strain sensor 2, either by means of assembly with adhesives or by direct co-molding of the casing 9.

According to an implementation option (illustrated for example in FIG. 9), the method provides fixing to the brake pad 10 and/or incorporating in the brake pad 10 the aforesaid detection element 90, together with the aforesaid collector 74 and the aforesaid frame 75, during the manufacturing of the brake pad, in a fixed and predefined position, of the base platform (or plate) 11 of the brake pad inside the friction material of the brake pad 12, by means of shape coupling or mechanical coupling 6 between base platform 11 and casing 9, so that at least one fiber-optic strain sensor 2 is completely incorporated in the desired portion of friction material.

According to an embodiment, the steps of the method are performed in one or both pads 10 of a disc brake caliper, and each pad 10 comprises a respective optical reading/interrogation unit 4 associated with it and/or bound to it.

According to another embodiment, the steps of the method are performed in both pads 10 of a disc brake caliper, and the aforesaid steps of receiving and generating are performed by a single optical reading/interrogation unit 4, associated with the brake caliper, and operationally connected to both pads 10, by means of a single optical interface 3 or by means of two separate optical interfaces 3.

According to another embodiment (illustrated for example in FIG. 19), the steps of the method are performed in both brake pads of a plurality of disc brake calipers of a vehicle brake system, and the aforesaid steps of receiving and generating are performed by one or more optical reading/interrogation units 4, operationally connected to the brake pads of all the brake calipers of the aforementioned plurality of disc brake calipers of a vehicle brake system.

According to different implementation options, the method comprises one or more of the further steps listed below:
- obtaining a dynamic measurement of the real-time trend of the clamping force CF and/or braking torque BT, based on the time evolution of the measured first strain S1 and second strain S2; and/or
- detecting possible malfunctions of the fiber-optic sensors 2, 5; and/or
- estimating a pad wear level 10, on the basis of detections made by fiber-optic sensors 2, 5; and/or
- estimating an emitted particulate level due to braking friction, based on detections made by fiber-optic sensors 2, 5; and/or
- upon a braking event, measuring the braking pressure, calculating the effective friction coefficient of the braking and calculating the actual clamping force of the brake caliper, on the basis of the measurements performed by the fiber-optic sensors 21, 22 on both pads of the brake caliper;
- upon a braking event, measuring possible imbalances between the braking pressures of the pads of a brake caliper or of one or more brake calipers, on the basis of the measurements made by the fiber-optic sensors 2, 5 on the pads of the one or more brake calipers; and/or
- upon a braking event, detecting possible malfunctions of one or more brake caliper pads, on the basis of the detections performed by the fiber-optic sensors 2, 5 on the aforesaid one or more pads of the one or more brake calipers.

A sensorized brake pad 10 (or sensorized pad 10) for a friction brake caliper of a vehicle brake system according to the present invention will now be described with reference again to FIGS. 1-19.

Such sensorized pad 10 (as shown for example in FIG. 3 or in FIG. 10) comprises a brake pad 1 made of material adapted to generate braking friction when placed in contact with a friction brake disc by the brake caliper upon a braking event; and it further comprises a casing 9 containing at least one fiber-optic strain sensor 2, incorporated in a portion of friction material M of the brake pad 10 adhering to a base plate or platform 11 of the brake pad 10, and a connection optical interface 3.

The portion of friction material M is sensitive to friction so that the shearing (i.e., tangential) strain St-eff to which the casing 9 is subject in a tangential reference direction x is representative of the tangential force Ft acting on the sensorized brake pad 10, and the normal force Fn-eff to which the casing 9 is subject in a normal reference direction y is representative of the normal force Fn acting on the sensorized brake pad 10 and representative of the clamping force CF and/or of the braking torque Bt applied on the brake disc.

The at least one fiber-optic strain sensor 2 is configured to perform the following actions: detecting a first strain S1, present in a first position of the casing 9 along a predefined first spatial direction w1, wherein such first strain S1 is dependent both on the normal force Fn-eff and on the tangential force St-eff acting on the casing 9; furthermore, detecting a second strain S2, present in a second position of the casing 9 along a predefined second spatial direction w2, wherein such second strain S2 is dependent both on the normal force Fn-eff and on the tangential force St-eff acting on the casing 9; furthermore, generating a first photonic signal L1, representative of the first detected strain S1, and a second photonic signal L2, representative of the second detected strain S2.

The optical connection interface 3 is connected to the fiber-optic strain sensor 2, and is adapted to be connected to an optical reading/interrogation unit 4 to transmit the aforesaid first photonic signal L1 and second photonic signal L2.

According to an embodiment of the sensorized pad 10, the fiber-optic strain sensor 2 is a sensor of the fiber Bragg grating type, and the aforesaid predetermined first spatial direction w1 and second spatial direction w2 are directions different from aforesaid tangential x and normal y reference directions.

According to an implementation option of the sensorized pad 10, the first spatial direction w1 and the second spatial direction w2 are symmetric with respect to the normal reference direction y, According to another implementation option of the sensorized pad 10, the first spatial direction w1 and the second spatial direction w2 form complementary angles with respect to a positive orientation of the tangential reference direction x.

According to another implementation option of the sensorized pad 10, the angle β formed by the first spatial direction w1 with the positive direction of the tangential reference direction x is equal to the angle β formed by the second spatial direction w2 with the negative tangential reference direction x.

According to another embodiment of the sensorized pad 10, the aforesaid fiber-optic strain sensor 2 is a sensor of the fiber Bragg grating type arranged in a birefringent fiber.

In this case, the predefined first spatial direction w1 coincides with the tangential reference direction x and the aforesaid second spatial direction w2 is a direction perpendicular to the tangential reference direction x.

According to an embodiment of the sensorized pad 10 (illustrated for example in the FIGS. 3-6), the fiber-optic strain sensor 2 comprises a first sensor element 21 comprising a first fiber Bragg grating, arranged in the aforesaid first position, within a first portion of fiber-optic fiber arranged to be aligned with the aforesaid first spatial direction w1; and a second sensor element 22 comprising a second fiber Bragg grating, arranged in the aforesaid second position, within a second portion of optical fiber arranged so as to be aligned with the aforesaid second spatial direction w2.

According to an implementation option, the first sensor element 21 and the second sensor element 22 are comprised in a single optical fiber 25.

According to another implementation option, the first sensor element 21 and the second sensor element 22 are comprised in two different respective optical fibers 25, 26.

According to other possible implementation options, the sensor elements comprised in the fiber-optic strain sensor (i.e., strain sensor assembly) are a plurality comprising any number of sensor elements greater than two.

According to an embodiment (illustrated for example in the FIGS. 4-6), the sensorized pad 10 further comprises at least one fiber-optic temperature sensor 5 encapsulated in the casing 9 in a third position near the aforesaid first position and second position.

The at least one fiber-optic temperature sensor 5 is configured to detect the temperature present in the third position and to generate a third photonic signal LT representative of the detected temperature.

In such a case, the connection optical interface 3 is further connected to the fiber-optic strain sensor 5 and is adapted to be connected to the optical reading/interrogation unit 4 to transmit also the third photonic signal LT.

According to an implementation option, the fiber-optic temperature sensor is a fiber Bragg grating fiber-optic temperature sensor.

According to an implementation example, the aforesaid fiber-optic strain sensor and temperature sensor are mutually integrated.

According to an implementation option, the fiber-optic temperature sensor 5 is a fiber-optic temperature sensor of the fiber Bragg grating type and includes a third sensor element 23 comprising a third fiber Bragg grating, obtained in the optical fiber 25 containing the aforesaid first 21 and second sensor element 22. Such third Bragg grating in the dedicated optical fiber is assembled in the casing into a suitable cavity and/or capillary tube 71 so as not to be affected by thermal expansion and deformation of the material in which it is placed.

According to another implementation option, the fiber-optic temperature sensor 5 is a fiber-optic temperature sensor of the fiber Bragg grating type and includes a third sensor element 23 which comprises a third fiber Bragg grating, obtained in one of the optical fibers (25 or 26) containing the first or the second strain sensor of the fiber Bragg grating type, in a third position distinct from the first or second position and placed outside the casing and thus in the friction material or in a stretch of fiber contained in the casing. In both cases, this third fiber Bragg grating is inserted into a cavity of the casing or in a capillary tube 71 which isolates it from possible thermal expansion and deformation phenomena of the material in which it is encapsulated.

According to an embodiment, the sensorized pad 10 further comprises an optical reading/interrogation unit 4, which can be connected to a remote control unit 20 external to the pad.

The optical read/interrogation unit 4 is optically connected to the optical interface to receive the aforesaid first photonic signal L1 and second photonic signal L2 and is configured to generate at least one or more electrical signals E1, E2, representative of the first photonic signal L1 and second photonic signal L2, and indicative of the detected first strain S1 and second strain S2. The aforesaid one or more electrical signal E1, E2 are adapted to be transmitted to the remote control unit 20.

According to an implementation option of the sensorized pad 10 (illustrated for example in FIG. 3), the connection optical interface 3 comprises one or more connection optical fibers 31, each configured to carry a respective optical activation radiation OA1, OA2, intended for a respective sensor element 21, 22, and to carry a respective optical reflected spectrum, forming a respective photonic signal, between the aforesaid first L1 and/or second L2 photonic signals.

According to another implementation option of the sensorized pad 10 (illustrated for example in FIG. 4), one of the connecting optical fibers 31 is further configured to carry a respective optical activation radiation OAT of the temperature sensor 23 and to carry a respective optical reflected spectrum, which forms the third photonic signal LT (in addition to the optical radiation and the photonic signal reflected by the strain sensor FBG comprised in the same optical fiber 25 which also comprises the temperature sensor 23).

According to another implementation option of the sensorized pad 10 (illustrated for example in FIG. 5), the optional connection interface 3 comprises an input connection optical fiber 32 shared by the first OA1 and/or second OA2 optical activation radiation, wavelength-multiplexed, and an output connection optical fiber 33 shared by the transmitted optical spectra which form the first (L1) and/or second (L2) photonic signal, wavelength-multiplexed, in which a plurality of sensor elements are obtained in a same fiber, and the photonic signals emitted by the sensors comprise transmitted optical spectra.

According to another implementation option of the sensorized pad 10 (illustrated for example in FIG. 6), the optical connection interface 3 comprises a connection optical fiber 35 shared by the first OA1 and/or second OA2 and/or third OAT optical activation radiation, wavelength multiplexed, and by the reflected spectra which form the first L1 and/or second L2 and/or third LT photonic signal, wavelength-multiplexed, if a plurality of sensor elements are made in a same fiber, and the photonic signals emitted by the sensors comprise reflected optical spectra.

In another implementation option (not illustrated in the figures), the third optical activation radiation OAT is transmitted over a dedicated connection optical fiber 34 to the temperature sensor 5, and the third photonic signal LT comprises an optical reflected spectrum LT which is sent to the optical reading/interrogation unit 4 through the same dedicated connection optical fiber 34.

According to an implementation option, each connection between a fiber in which the fiber Bragg grating type sensors are obtained and a connection optical fiber to the optical reading/interrogation unit is made by means of a detachable fiber splice or photonic connection element.

According to an embodiment (illustrated for example in the FIGS. 10-13), the sensorized brake pad 10 comprises a base platform (or plate) 11 of the brake pad, within the friction material 12 of the brake pad.

The sensor pad 10 further comprises at least one detection element 90, which, in turn, comprises a casing 9, containing at least one fiber-optic strain sensor 2 (fixed by means of an adhesive 7 inside the appropriate cavities 71) and at least one capillary connection tube 73.

The casing 9, made of mineral and/or plastic and/or polymeric material and/or resin compound, is distinct from the brake pad 10 and can be fixed and/or incorporated in it. The casing 9 is configured to house (and under operating conditions houses) at least one fiber-optic strain sensor 2 and the fiber-optic temperature sensor 5, and at least one portion of the connection optical interface 3.

The at least one capillary connection tube 73, exiting from the casing 9, is configured to enclose one or more connection fibers of the optical interface 3.

In this case, the sensorized pad 10 further comprises a collector 74 fixed to the brake pad and connectable to a protective output tube of the connection optical interface 30 external to the brake caliper and connectable to the reading/interrogation unit 4. The aforesaid at least one capillary connection tube 73 is routed towards the collector 74 and connected to it.

According to an implementation option, the casing 9 is fixed to the sensorized pad 10 by means of an adhesive 7, which fixes the one or more optical fibers 25, 26, containing the fiber-optic sensors 2, 5, in given portions 71 of the casing 9, adapted to orient the optical fibers in the correct position and route them. Such fixing structure 7 is, in turn, used in two embodiments of the casing 9 (illustrated in the FIGS. 7A and 8A).

According to a more specific implementation option, the aforesaid casing 9 is made of mineral and/or plastic and/or polymer material and/or resin compound, in which at least one fiber-optic strain sensor 2 is embedded, by assembling it with adhesives or co-molding.

In such a case, the aforesaid detection element 90 is fixed to the brake pad 10 and/or incorporated into the brake pad 10 in a fixed and predefined position, of the base platform or plate 11 in the friction material 12 of the brake pad, by shape coupling or mechanical coupling 6 between the base platform 11 and the casing 9, so that at least one fiber-optic strain sensor 2 is completely incorporated in the desired portion of friction material M.

FIGS. 7A and 8A (and the respective enlarged details in FIGS. 7B and 8B) illustrate two possible embodiments of the incorporation of strain sensors 2 in the casing 9, by means of an adhesive 7 and inside specific cavities 71 in the casing 9 and also the capillary connection tube 73.

According to an embodiment, the sensorized pad 10 comprises a plurality of detection elements 90, each fixed in a portion of friction material M and comprising a casing 9, a respective at least one optical fiber strain sensor 2 incorporated in it, an adhesive 7 and appropriate cavities 71 in the casing 9.

FIGS. 11, 12, 13 illustrate three different embodiments of the sensorized pad 10, comprising one, two, and three detection elements 90 respectively.

By virtue of the aforesaid features, the sensorized pad 10 is characterized by great flexibility in terms of the choice of positions in which to place the detection elements 90. Indeed, many different implementation options are possible with reference to the number and location of the detection elements 90 containing the fiber-optic strain sensors 2.

A brake caliper for vehicle disc brake system is now described. Such brake caliper comprises one or two sensorized brake pads 10 according to any one of the embodiments described above.

With reference to the FIGS. 1-6 and 15-19, a system 100 is described for detecting and measuring a clamping force and/or a braking torque deriving from the actuation of a friction braking system for vehicle, by means of detection performed in at least one sensorized brake pad 10 of the braking system.

Such system for detecting and measuring a braking force and/or braking torque 100 comprises at least one sensorized pad 10 according to any one of the embodiments described above; and further comprises an optical reading/interrogation unit 4 and a remote control unit 20.

The optical reading/interrogation unit 4 is optically connected to the optical connection interface 3 of at least one sensorized pad 10 to receive the aforesaid at least one first photonic signal L1 and at least one second photonic signal L2.

The optical reading/interrogation unit 4 is configured to generate one or more electrical signals E1, E2, representative of the first detected strain S1 and the second detected strain S2, based on the aforesaid received first photonic signal L1 and second photonic signal L2.

The remote control unit 20, external to the sensorized pad, is connected to the optical reading/interrogation unit 4 to receive one or more electrical signals E1, E2, and is configured to process such one or more electrical signals E1, E2 to obtain and provide a measurement of the clamping force CF and/or a measurement of the braking torque BT.

According to an embodiment of the system 100, the optical reading/interrogation unit 4 is further configured to activate each fiber Bragg grating comprised in the sensor elements 21, 22, 23 incorporated in the sensorized pad 10, by transmitting a first optical activation radiation OA1 and/or a second optical activation radiation OA2 and/or a third optical activation radiation OAT.

Different implementation options of the system 100 correspond to the different arrangements of the strain sensors (and of the possible additional temperature sensor) that were described above while describing the method, and illustrated in FIGS. 4-6.

In particular, the implementation option of the system 100 (illustrated in the FIGS. 5 and 6) is mentioned in which the plurality of sensor elements 21, 22 and 23 are made in a same optical fiber, and each of the respective fiber Bragg gratings is associated with a respective different central operating wavelength $\lambda 1$, $\lambda 2$, $\lambda T$, is mentioned.

In this case, the optical reading/interrogation element 4 is further configured to transmit, through the connection optical interface 3, the respective optical activation radiations OA1, OA2, OAT to the plurality of sensor elements 21, 22, 23 centered at the respective operating wavelengths $\lambda 1$, $\lambda 2$, by means of wavelength-division multiplexing (WDM) transmission techniques.

Furthermore, the optical reading/interrogation unit 4 and is configured to receive, through the optical connection interface 3, and distinguishing the respective optical spectra either reflected or transmitted by each of the plurality of sensor elements 21, 22, 23 by means of de-multiplexing using wavelength-division multiplexing (WDM) techniques.

Further details about the optical reading/interrogation unit 4 will be provided below.

According to an embodiment of the system 100 (illustrated in FIG. 15), the optical reading/interrogation unit 4 comprises a broadband optical radiation source 40, an optical circulator 46 and an opto-electronic spectrometer receiver 41.

The broadband optical radiation source 40 is configured to transmit the aforesaid first activation optical radiation OA1 and/or second activation optical radiation OA2 and/or, if a temperature sensor is present, third activation optical radiation OAT.

The emitted optical radiation illuminates (through the input port and the through port of the optical circulator 46) the optical fiber containing the fiber Bragg grating (FBG) sensors, and causes a response by the FBG sensors, which generate respective retro-reflected photonic signals (L1, L2, L3), which are coupled to the opto-electronic receiver to spectrometer 41 through the output port of the optical circulator 46.

The opto-electronic spectrometer receiver 41 is configured to select the wavelength and/or plurality of wavelengths to be received and is further configured to receive each of the aforesaid at least one first photonic signal L1 and/or at least one second photonic signal L2 and convert it into a respective at least one first electrical signal E1 and/or second electrical signal E2; and/or receiving the aforesaid third photonic signal LT and converting it to the aforesaid third electrical signal ET.

According to another embodiment of the system 100 (illustrated in FIG. 16), the optical reading/interrogation unit 4 comprises a tunable optical radiation source 42, an optical circulator 46, and a photo-diode opto-electronic receiver 43.

The tunable optical radiation source 42 is configured to transmit, in a given instant of time, the desired optical radiation (OA1 in the example in FIG. 13) between the aforesaid first optical activation radiation OA1 and/or second optical activation radiation OA2, and/or third optical activation radiation OAT, each radiation being at the respective desired wavelength.

The emitted optical radiation illuminates (through the input port and the through port of the optical circulator 46) the optical fiber containing the fiber Bragg grating (FBG) sensors, and determines a response by the FBG sensors sensitive to the wavelength (e.g., λ1), which generates a recto-reflected photonic signal (e.g., L1), which is coupled to the photo-diode receiver 43 through the output port of the optical circulator 46.

The photo-diode opto-electronic receiver 43 is configured to receive the aforesaid retro-reflected photonic signal and to convert it into a corresponding electrical signal: for example, in subsequent instants, the photo-diode opto-electronic receiver 43 receives the aforesaid first photonic signal L1 and converts it into the first electrical signal E1, then receives the second photonic signal L2 and converts it into the second electrical signal E2, then receives the third photonic signal LT and converts it into the third electrical signal ET.

According to another embodiment of the system 100 (illustrated in FIG. 17), the optical reading/interrogation unit 4 is entirely made by means of a single photonic integrated circuit using PIC (Photonic Integrated Circuit) technology. In this case, such single integrated photonic circuit comprises a broadband optical radiation source 40, at least one wavelength optical filtering element 44, and a block of opto-electronic photo-diode receivers 43.

The broadband optical radiation source 40 is configured to transmit the first activation optical radiation OA1 and/or the second activation optical radiation OA2 and/or the third activation optical radiation OAT.

The emitted optical radiation (which comprises in the example of FIG. 17 the optical radiations OA1, OA2, OAT), through the input port and the through port of the optical circulator 46, illuminates the optical fiber containing the FBG sensors, each of which reflects a respective photonic signal L1, L2, LT. The photonic signal WDM as a whole, given by the sum of the signals L1, L2, LT, each at its own and different wavelength, is conveyed to the input of filter-optic element 44, through the output port of optical circulator 46.

The photo-diode opto-electronic receiver 43 is configured to receive, through the selected optical filtering element 44, the aforesaid first photonic signal L1 and second photonic signal L2 and convert them into said first electrical signal E1 or second electrical signal E2; and/or to receive said third photonic signal LT, if selected, and to convert it into said third electrical signal ET.

According to a further embodiment of the system 100 (illustrated for example in FIG. 18), the sensorized pad 10 comprises a fiber Bragg grating sensor 2 arranged in a birefringent fiber fb, and an optical reading/interrogation unit 4 comprises a tunable optical radiation source 42, a polarization beam splitter 45, a first opto-electronic photo-diode receiver 43a and a second opto-electronic photo-diode receiver 43b.

The tunable optical radiation source 42 is configured to transmit the first activation optical radiation OA1 and/or the second activation optical radiation OA2 and/or the third activation optical radiation OAT, each radiation being at the desired respective wavelength, according to what is desired in a given instant.

Figure 18:
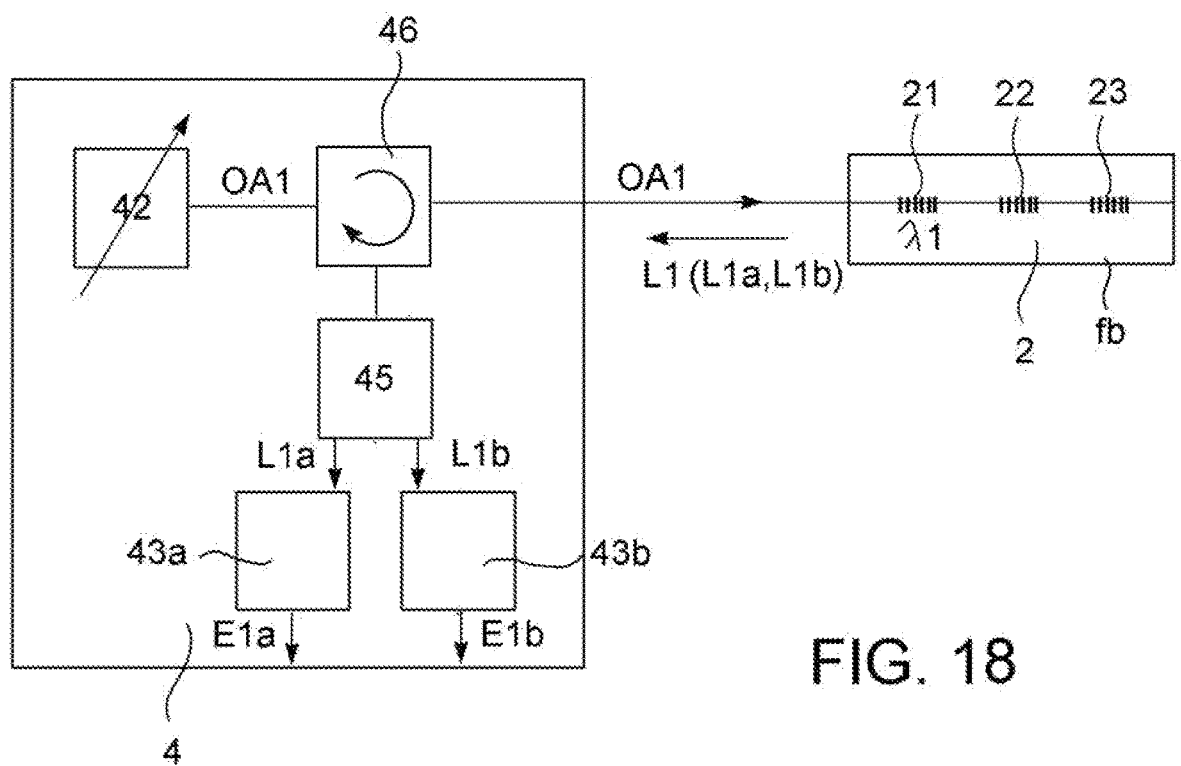

The emitted optical radiation (which comprises the optical radiation OA1, in the example in FIG. 18), by means of the input port and the through port of the optical circulator 46, illuminates the birefringent optical fiber containing the FBG sensors, each of which reflects a respective photonic signal. The photonic signal either reflected or transmitted by the birefringent fiber Bragg grating is composed of two components with a different first and second birefringence polarization (indeed, two photonic signals are obtained, which in the example in FIG. 18 are the first two photonic signals L1a, L1b).

The photonic signal WDM as a whole (given in FIG. 15 by the sum of the signals L1a and L1b) is conveyed to the input of the polarization beam splitter 45, through the output port of the optical circulator 46.

A polarization beam splitter 45 is configured to receive the aforesaid photonic signal either reflected or transmitted by the birefringent fiber Bragg grating, composed of two components with a different first and second birefringence polarization, respectively, and to generate a first optical beam L1a corresponding to the component with a first polarization and a second optical beam L1b corresponding to the component with a second polarization.

The first photo-diode opto-electronic receiver 43a is configured to receive the first optical beam L1a and to generate a corresponding first electrical signal E1a.

The second photo-diode opto-electronic receiver 43b is configured to receive the second optical beam L1b and to generate a corresponding second electrical signal E1b.

Concerning the details of receiving and processing the photonic signals generated by birefringent fiber optical sensors, known techniques for receiving and processing photonic signals generated by birefringent fiber optical sensors (e.g., as described in Singh P., Julich F., Roths J. "*Polarization dependence of the strain sensitivity of the fiber Bragg gratings inscribed in highly birefringent optical fibers*"—Optical Sensing and Detection II, 2012—doi10.1117.922733) can be used.

According to an implementation option of the system (already mentioned above while describing the sensorized pad), the optical reading/interrogation unit 4 is integrated and/or housed in the sensorized pad 10. In this case, electrical signals E are output from the sensorized pad and directed to the remote control unit.

According to another preferred implementation option of the system (illustrated, in different variants, in the FIGS. 3-6), the optical reading/interrogation unit 4 is external to the sensorized pad 10. In this case, photonic signals L are emitted from the sensorized pad, on fiber, directed towards the optical reading/interrogation unit 4 (according to the methods already described above).

Figure 19:
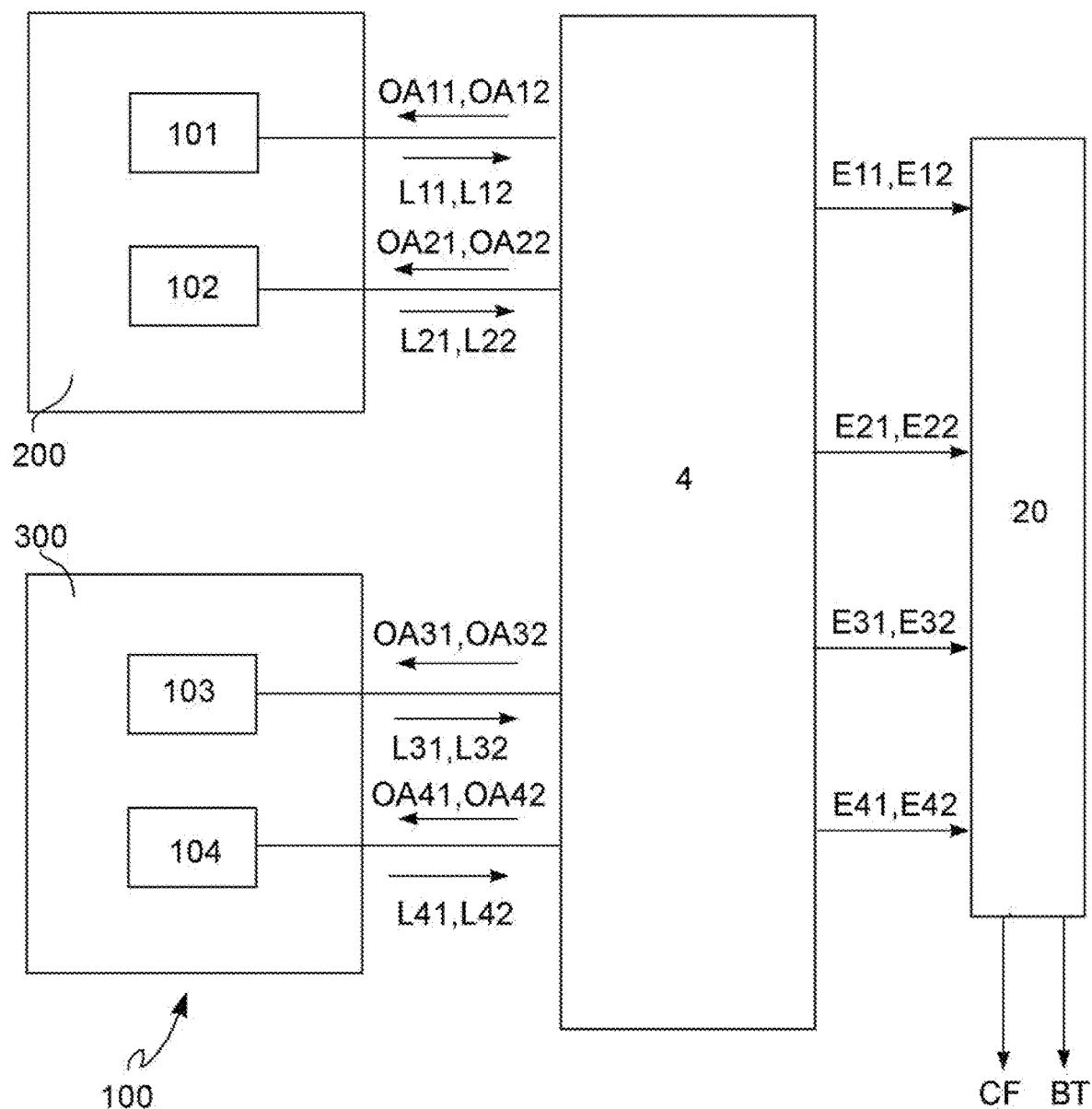
FIG. 19 illustrates an embodiment of a braking system according to the invention, comprising a plurality of sensorized brake pads, which in turn belong to a plurality of brake calipers of the braking system.

With reference to FIG. 19, a further embodiment of the system 100 for detecting and measuring a clamping force CF and/or braking torque BT is now described.

In such a case, the system 100 comprises a plurality of sensorized pads 101, 102, 103, 104, belonging to one or more brake calipers 200, 300 of the braking system of the vehicle, and a single optical reading/interrogation unit 4 which is operationally connected to each sensorized pad 101, 102, 103, 104 of the aforesaid plurality of sensorized pads.

The optical reading/interrogation unit 4 is configured to transmit a respective pair of optical activation radiations (OA11, OA12; OA21, OA22; OA31, OA32; OA41-OA42) to each of the fiber-optic strain sensors of the sensor brake pads 101-104 and to receive a respective pair of photonic signals (L11, L12; L21, L22; L31, L32; L41, L42), either reflected or transmitted, from each of these fiber optic strain sensors according to the chosen configuration. The optical reading/interrogation unit 4 is also configured to generate a plurality of respective electrical signals (E11, E12; E21, E22; E31, E32; E41, E42), based on photonic signals (L11, L12; L21, L22; L31, L32; L41, L42), received from the plurality of sensorized brake pads 101-104.

In the example illustrated in FIG. 19, there are two brake calipers connected to the optical reading/interrogation unit 4. In other implementation examples, such number may be different from two (for example, four).

Furthermore, in other possible implementation options, wherein each sensorized pad comprises multiple detection elements, each of the detection elements is illuminated by the optical reading/interrogation unit 4 and provides a respective pair of photonic signals. In this case, the number of photonic signals received and converted into electrical signals by the optical reading/interrogation unit is 2×N×K, where N is the number of detection elements in each sensorized pad and K is the number of sensorized pads connected to the optical reading/interrogation unit 4.

Furthermore, in other possible implementation options, the sensorized pads also send respective third photonic signals LT, derived from temperature sensors 5, to the optical reading/interrogation unit 4, which generates respective electrical signals ET.

All the aforesaid electrical signals, generated in the various possible cases, by the optical reading/interrogation unit, are sent to the remote control unit 20, which can determine the clamping force CF and/or braking torque BT based on the plurality of electrical signals received.

According to an embodiment of the system 100, the remote control unit 20 comprises at least one processor, in which one or more software programs are stored, configured to run an algorithm adapted to calculate the clamping force CF and/or braking torque BT, on the basis of the determined first strain S1 and second strain S2, and/or on the basis of the determined first strain S1, second strain S2 and temperature.

According to a more specific implementation option, the step of calculating comprises calculating the clamping force CF and/or braking torque BT by means of predefined non-linear ratios between the clamping force CF and/or the braking torque BT and the strains detected by each of the strain sensors FBG in the respective position in which it is incorporated in the brake pad (where, as illustrated above several times, the strains are detected to be representative of both the normal forces and the tangential components of the forces generating them).

Such predetermined non-linear ratios are, for example, represented by computerized models or look-up tables stored to be accessible by the processor of the control unit 20.

The aforesaid predetermined non-linear ratios are, for example, determined by means of experiments and/or characterization and/or calibration performed after at least one strain sensor 2 was incorporated in the brake caliper 10, and before using the brake caliper 10.

According to an implementation example, the aforesaid steps of testing and/or characterizing and/or calibrating may comprise functional and/or structural simulations, e.g. calculations based on finite element methods (FEM).

The calculations and elaborations mentioned above make it possible to define non-linear ratios between strain measurements at one or more points of the pad and the clamping force and/or braking torque, thus making it possible to estimate the clamping force and/or braking torque based on the strain measurements made.

A disc brake system for a vehicle, comprised in this invention, will now be described.

According to an embodiment, the braking system comprises a brake system with friction brakes, which comprises a plurality of brake pads according to one of the embodiments described above.

According to another embodiment, the braking system comprises a braking system with friction brakes and further comprises a system 100 for detecting and measuring a clamping force and/or braking torque resulting from the embodiment of the braking system, according to an embodiment described above.

It is worth noting that the object of the present invention is fully achieved by the method, the sensorized brake pad, and the system illustrated above, by virtue of their functional and structural features.

Indeed, the technical solution described here provides one or more photonic sensors which can be easily and effectively integrated and/or fixed and/or incorporated into a brake pad of a friction brake caliper, for an indirect but precise and reliable measurement of the clamping force resulting from a brake actuation, or of the torque generated by the clamping force of the brake caliper on the brake disc.

The fiber optic sensor consists of several strain sensor elements based on fiber Bragg grating (FBG) technology.

The sensor elements can detect strains in at least two different positions and are configured and/or arranged to detect respective strains which are representative of both a normal force and a tangential force component acting in the respective position.

In turn, the normal and tangential forces acting locally in each of the detecting positions are closely related, and are therefore faithfully representative, of the forces acting on the brake pad due to the clamping force and braking torque.

Furthermore, the simultaneous detection of normal and tangential strains in at least two well-defined positions make it possible to define such quantities effectively.

Advantageously, the technical solution according to the invention makes it possible to detect and/or determine both the clamping force and the braking torque (as illustrated above).

Advantageously, at least one temperature sensor, also in FBG technology, is further provided, which allows even more precise, temperature-compensated estimates to be obtained.

Advantageously, in some embodiments, the strain sensor is incorporated into a polymer or mineral material casing which can be fixed and/or incorporated into the brake pad in a desired position.

Advantageously, the one or more fibers containing the fiber-optic sensor elements can be attached to the aforesaid casing with a precise orientation by means of an adhesive.

The aforesaid features ensure the correct positioning and orientation of the strain sensors in the desired points on the brake pad.

Advantageously, the possibility of detecting the strain in several positions on the brake pad helps to determine the clamping force and/or braking torque more accurately, albeit indirectly.

By virtue of the aforesaid features, the sensorized pad is characterized by great flexibility in terms of the choice of the number and positions in which to place the sensors.

The system consists of the aforesaid sensorized brake pad, which comprises fiber-optic sensors, optically connected to a reading/interrogation unit (which can be remote or also integrated in the brake pad) for an opto-electronic conversion of the strain information, which, advantageously, can also be based on WDM techniques.

The reading/interrogation unit can be made based on different electro-optical technologies.

Advantageously, such reading/querying unit can be achieved by means of silicon-based photonic technologies (e.g. PIC: Photonics Integrated Circuit), which allows making such unit also by integrating it in the sensorized brake caliper or in the electronic control unit.

The control unit of the system can thus determine the clamping force and/or braking torque with great accuracy, with temperature compensation, and over a wide operating range.

Furthermore, advantageously, several sensorized pads (each containing two or more sensors) can be connected to a single reading/interrogation unit, providing a large number of significant signals on the basis of which the accuracy of the determination of clamping force and/or braking torque can be improved, as required.

The person skilled in the art may make many changes and adaptations to the embodiments described above or may replace elements with others which are functionally equivalent to satisfy contingent needs without however departing from the scope of the appended claims. All the features described above as belonging to one possible embodiment may be implemented independently from the other described embodiments.

The invention claimed is:

1. A method for detecting and measuring a clamping force and/or a braking torque deriving from actuation of a friction braking system for vehicle, by detection performed in a brake pad of the friction braking system, said method comprising:
   encapsulating at least one fiber-optic strain sensor in a casing, and incorporating said casing in a respective portion of friction material adhering to a base plate or platform of said brake pad,
   said respective portion of friction material being sensitive to friction so that a tangential strain to which the casing is subject in a tangential reference direction is representative of a tangential force acting on the brake pad, and a normal force which the casing is subject in a normal reference direction is representative of the normal force acting on the brake pad;
   detecting, by said at least one fiber-optic strain sensor, a first strain, present in a first position of the casing along a predefined first spatial direction, said first strain being dependent both on the normal force and on the tangential strain acting on the casing;
   detecting, by said at least one fiber-optic strain sensor, a second strain, present in a second position of the casing along a predefined second spatial direction, said second strain being dependent both on the normal force and on the tangential strain acting on the casing;
   generating, by the at least one fiber-optic strain sensor, a first photonic signal, representative of the first detected strain, and a second photonic signal, representative of the second detected strain;
   receiving said first photonic signal and second photonic signal, by an optical reading/interrogation unit, optically connected to said at least one fiber-optic strain sensor;
   determining, by the optical reading/interrogation unit, a value of the first strain and the value of the second strain, on the basis of said first received photonic signal and second received photonic signal, respectively; and
   determining a measurement of the clamping force and/or of the braking torque based on the determined values of said first strain and second strain.

2. The method of claim 1, wherein said at least one fiber-optic strain sensor is a sensor of fiber Bragg grating type, and said predefined first spatial direction and second spatial direction are directions different from said tangential and normal reference directions.

3. The method of claim 2, wherein
   said predefined first spatial direction and said predefined second spatial direction are symmetric with respect to the normal reference direction, or
   said predefined first spatial direction and said predefined second spatial direction form complementary angles with respect to a positive tangential reference direction,
   or the angle ($\beta$) formed by the predefined first spatial direction with the positive tangential reference direction is equal to the angle ($\beta$) formed by the predefined second spatial direction with a negative tangential reference direction.

4. The method of claim 1, wherein said at least one fiber-optic strain sensor is a fiber Bragg grating type sensor arranged in a birefringent fiber, and wherein said predefined first spatial direction coincides with the tangential reference direction and said predefined second spatial direction is a direction perpendicular to the tangential reference direction.

5. The method of claim 1, wherein the at least one fiber-optic strain sensor comprises:
   a first sensor element comprising a first fiber Bragg grating, arranged in said first position, within a first portion of optical fiber arranged to be aligned with said predefined first spatial direction;

a second sensor element comprising a second fiber Bragg grating, arranged in said second position, within a second portion of optical fiber arranged to be aligned with said predefined second spatial direction, wherein said first sensor element and said second sensor element are comprised in a single optical fiber, or wherein said first sensor element and said second sensor element are comprised in two different respective optical fibers.

6. The method of claim 1, wherein said determining step comprises:

generating, by the optical reading/interrogation unit, a first electrical signal representative of said first photonic signal and a second electrical signal representative of said second photonic signal;

transmitting said first electrical signal and said second electrical signal to a control unit; and calculating the clamping force and/or braking torque, by a processor of the control unit by one or more algorithms executed by one or more software programs, on the basis of said first electrical signal and second electrical signal.

7. The method of claim 6, wherein the calculating step comprises:

calculating a braking torque measurement on the basis of a differential strain (ΔS) given by a difference between the determined values of the first strain and of the second strain, through a proportionality coefficient depending on geometric parameters relating to an arrangement of sensors with respect to the tangential and normal reference directions, on geometric parameters relating to the brake pad and to positioning of a sensor in the brake pad, and on parameters representative of friction coefficients of materials of which the casing and the friction material are made, and/or wherein the calculating step comprises:

calculating the clamping force, or a normal force or pressure acting on the brake pad, on the basis of the normal force or pressure acting on a portion of friction material, incorporated in the brake pad, wherein said normal force or pressure acting on the portion of friction material is calculated on the basis of the detected first strain and/or of the detected second strain, through a proportionality coefficient dependent on geometric parameters relative to the arrangement of the sensors with respect to the tangential and normal reference directions and on Young's modulus of the friction material.

8. The method of claim 1, further comprising:

encapsulating a fiber-optic temperature sensor in the casing, in a third position near said first and second positions;

detecting, by the fiber-optic temperature sensor, temperature in a third position, and generating a third photonic signal representative of the detected temperature;

receiving said detected third photonic signal by the optical reading/interrogation unit, optically connected to said at least one fiber-optic strain sensor; and determining, by the optical reading/interrogation unit, a temperature value, on the basis of the third received photonic signal;

wherein the step of determining a measurement of the clamping force and/or of the braking torque comprises determining a measurement of the clamping force and/or of the braking torque on the basis of the determined values of the first strain and of the second strain and of the determined temperature value;

and wherein the fiber-optic temperature sensor is a fiber-optic temperature sensor of the fiber Bragg grating type, comprising a third sensor element comprising a third fiber Bragg grating, obtained in an optical fiber containing the first and/or second fiber Bragg grating of the at least one fiber-optic strain sensor, in a third position distinct from the first or second position, or wherein the step of determining a measurement of the clamping force and/or of the braking torque comprises:

calculating a strain value due to a thermal variation, on the basis of the determined temperature value;

subtracting the strain value due to a thermal variation from an overall measured value of the first strain, to obtain a first effective strain value, dependent only on mechanical effects;

subtracting the strain value due to a thermal variation from the overall measured value of the second strain, to obtain a second effective strain value, dependent only on mechanical effects; and determining a measurement of the braking force and/or of the braking torque on the basis of the first effective strain and of the second effective strain values.

9. The method of claim 1, wherein the at least one fiber-optic strain sensor and/or the fiber-optic temperature sensor are connected to the optical reading/interrogation unit by a connection optical interface and wherein:

said first photonic signal comprises a first optical spectrum either reflected or transmitted by the first sensor element, which reaches the optical reading/interrogation unit by said connection optical interface; and/or said second photonic signal comprises a second optical spectrum either reflected or transmitted by the second sensor element, which reaches the optical reading/interrogation unit by said connection optical interface; and/or said third photonic signal comprises a third optical spectrum either reflected or transmitted by the third sensor element, which reaches the optical reading/interrogation unit said connection optical interface;

wherein the optical reading/interrogation unit is configured to activate said first sensor element, and/or second sensor element, and/or third sensor element by transmitting an optical activation radiation or a respective optical activation radiation through said connection optical interface.

10. The method of claim 1, wherein, when a plurality of sensor elements are made in a same optical fiber, each respective fiber Bragg grating is associated with a respective different central operating wavelength, and wherein the method further comprises:

transmitting, by the optical reading/interrogation unit, through the connection optical interface, the respective optical activation radiation) to the plurality of sensor elements, at respective central operating wavelengths ($\lambda 1$, $\lambda 2$), through wavelength-division multiplexing (WDM) transmission techniques; and receiving, through the connection optical interface, and distinguishing respective optical spectra either reflected or transmitted by each sensor element of the plurality of sensor elements by de-multiplexing using wavelength-division multiplexing (WDM) techniques.

11. The method of claim 10, wherein:

if a plurality of sensor elements are made in the same optical fiber, and photonic signals emitted by the plurality of sensor element comprise transmitted optical spectra, said connection optical interface comprises an input connection optical fiber shared by the first and/or second and/or third optical activation radiation, wavelength multiplexed, and an output connection optical fiber shared by the transmitted optical spectra which form the first and/or second and/or third photonic signal, wavelength multiplexed; or if a plurality of sensor elements are made in the same optical fiber, and photonic signals emitted by the plurality of sensor elements comprise reflected optical spectra, said connection optical interface comprises a connection optical fiber shared by the first and/or second and/or third optical activation radiation, wavelength multiplexed, and of the reflected spectra which form the first and/or second and/or third photonic signal, wavelength multiplexed.

12. The method of claim 1, wherein said casing is made of polymeric or mineral material, is distinct from the brake pad and is fixable to and/or incorporatable in the braking pad, having predetermined geometry and dimensions, said casing being adapted to house at least one fiber-optic strain sensor and fiber-optic temperature sensor, and at least one portion of the connection optical interface,
and wherein the encapsulating step comprises:
embedding at least one fiber-optic strain sensor within said casing;
incorporating said casing in the brake pad and/or fixing said casing to the brake pad, during manufacturing of the brake pad, in a fixed and predefined position in said portion of friction material,
and/or wherein the step of embedding at least one fiber-optic strain sensor in said casing comprises:
incorporating one or more optical fibers containing fiber-optic sensors, and/or one or more connection fibers of the connection optical interface by an adhesive, in casing portions) of the casing, adapted to orient the one or more optical fibers in a correct position and route them;
incorporating by the adhesive, inside the casing portions of said casing, one or more connection fibers of the connection optical interface in a capillary connection tube exiting from the casing and adapted to be routed on the brake pad by a capillary tube or frame structure towards a collector fixed to the brake pad and connectable to a protective output tube of the connection optical interface external to a brake caliper and connectable to the reading/interrogating unit,
wherein said casing, containing said at least one fiber-optic strain sensor, fixed by an adhesive inside casing portions of the casing, and said capillary connection tube form a detection element),
and/or
wherein the casing is made of at least one of mineral, plastic, polymer material, and resin compound,
and wherein said encapsulating step comprises:
incorporating at least one fiber-optic strain sensor, either by assembly with adhesives or by direct co-molding of the casing; and
fixing to the brake pad and/or incorporating in the brake pad said detection element, comprising the casing, and also said collector and said capillary tube or frame structure, during the manufacturing of the brake pad, in a fixed and predefined position, of a base platform of the brake pad inside the friction material of the brake pad, by shape coupling or mechanical coupling between the base platform and the casing, so that at least one fiber-optic strain sensor is completely incorporated in a desired portion of the friction material.

13. The method of claim 1, wherein the steps of the method are performed in one or both brake pads of a disc brake caliper, and wherein each brake pad comprises a respective optical reading/interrogation unit associated with the brake pad and/or bound to the brake pad,
or wherein the steps of the method are performed in both brake pads of a disc brake caliper, and wherein said receiving and generating steps are performed by a single optical reading/interrogation unit, associated with the dis brake caliper, and operationally connected to both brake pads, by a single connection optical interface or by two separate connection optical interfaces,
or
wherein the steps of the method are performed in both brake pads of a plurality of disc brake calipers of a braking system of a vehicle,
and wherein said receiving and generating steps are performed by one or more optical reading/interrogation units, operationally connected to the brake pads of all disc brake calipers of said plurality of disc brake calipers of the braking system of the vehicle.

14. The method of claim 1, further comprising one or more of the following steps:
obtaining a dynamic measurement of real-time trend of the clamping force and/or braking torque, based on time evolution of the determined values of the first strain and second strain; and/or
detecting possible malfunctions of the fiber-optic sensors; and/or
estimating a brake pad wear level on the basis of detections made by the fiber-optic sensors; and/or
estimating an emitted particulate level due to braking friction, based on detections made by fiber-optic sensors; and/or
upon a braking event, measuring braking pressure, calculating an effective friction coefficient of braking and calculating an actual clamping force of the disc brake caliper, on the basis of measurements performed by the fiber-optic sensors on both brake pads of the disc brake caliper;
upon a braking event, measuring possible imbalances between braking pressures of the brake pads of one or more disc brake calipers, on the basis of the measurements made by the fiber-optic sensors on said brake pads of the one or more disc brake calipers;
upon a braking event, detecting possible malfunctions of one or more brake pads, on the basis of the measurements performed by the fiber-optic sensors on said one or more brake pads of the one or more disc brake calipers.

15. A sensorized brake pad for a brake caliper of a friction braking system for vehicle, comprising:
a brake pad made of material adapted to generate braking friction when placed in contact with a friction brake disc by the brake caliper upon a braking event; and
a casing containing at least one fiber-optic strain sensor, incorporated in a portion of friction material of the brake pad adhering to a base platform of the brake pad, said portion of friction material being sensitive to friction, so that a tangential shear strain to which the casing is subject in a tangential reference direction is representative of a tangential force acting on the brake pad, and a normal force to which the casing is subject in a normal reference direction is representative of a normal force acting on the brake pad, and representative of a clamping force and/or braking torque applied on the friction brake disc;
  wherein said at least one fiber-optic strain sensor is configured to:
  detect a first strain, present in a first position of the casing along a predefined first spatial direction, said first strain being dependent both on the normal force and on the tangential force acting on the casing;
  detect a second strain, present in a second position of the casing along a predefined second spatial direction, said second strain being dependent both on the normal force and on the tangential force acting on the casing; and
  generate a first photonic signal, representative of the first detected strain, and a second photonic signal, representative of the second detected strain; wherein sensorized brake pad further comprises:
  a connection optical interface, connected to said at least one fiber-optic strain sensor, and adapted to be connected to an optical reading/interrogation unit to transmit said first photonic signal and second photonic signal.

16. The sensorized brake pad of claim 15, wherein said at least one fiber-optic strain sensor is a sensor of fiber Bragg grating type, and said predefined first spatial direction and second spatial direction are directions different from said tangential and normal reference directions,
  and/or wherein said predefined first spatial direction and said predefined second spatial direction are symmetric with respect to the normal reference direction,
  or said predefined first spatial direction and said predefined second spatial direction form complementary angles with respect to a positive tangential reference direction,
  or the angle (β) formed by the predefined first spatial direction with the positive tangential reference direction is equal to the angle (β) formed by the predefined second spatial direction with a negative tangential reference direction,
  and/or
  wherein said at least one fiber-optic strain sensor is a sensor of fiber Bragg grating type arranged in a birefringent fiber,
  and wherein said predefined first spatial direction coincides with the tangential reference direction and said predefined second spatial direction is a direction perpendicular to the tangential reference direction.

17. The sensorized brake pad of claim 15, wherein the at least one fiber-optic strain sensor comprises:
  a first sensor element comprising a first fiber Bragg grating, arranged in said first position, within a first portion of optical fiber arranged to be aligned with said predefined first spatial direction;
  a second sensor element comprising a second fiber Bragg grating, arranged in said second position, within a second portion of optical fiber arranged to be aligned with said predefined second spatial direction;
  wherein said first sensor element and said second sensor element are comprised in a single optical fiber,
    or wherein said first sensor element and said second sensor element are comprised in two different respective optical fibers.

18. The sensorized brake pad of claim 15, further comprising:
  at least one fiber-optic temperature sensor encapsulated in the casing, in a third position near said first and second positions; wherein
  said at least one fiber-optic temperature sensor is configured to detect a temperature present in the third position, and to generate a third photonic signal representative of the detected temperature; and wherein
  said connection optical interface is further connected to the at least one fiber-optic strain sensor, and is adapted to be connected to the optical reading/interrogation unit to transmit also said third photonic signal.

19. The sensorized brake pad of claim 18, wherein the at least one fiber-optic temperature sensor is a fiber-optic temperature sensor of fiber Bragg grating type, and comprises a third sensor element comprising a third fiber Bragg grating, obtained in an optical fiber containing said first and second sensor elements;
  or wherein the at least one fiber-optic temperature sensor is a fiber-optic temperature sensor of fiber Bragg grating type, and comprises a third sensor element which comprises a third fiber Bragg grating, made in one of optical fibers containing a first fiber-optic sensor or a second fiber-optic strain sensor of fiber Bragg grating type, in a third position distinct from the first or second position and placed outside the casing and thus in the friction material or in a stretch of fiber,
  or wherein the third sensor element is inserted into a cavity of the casing or in a capillary tube which isolates it from possible thermal expansion and deformation phenomena of the material in which it is encapsulated.

20. The sensorized brake pad of claim 15, wherein the connection optical interface comprises:
  one or more connection optical fibers, each configured to carry a respective optical activation radiation, for a respective sensor element, and to carry a respective reflected optical spectrum, which form a respective photonic signal, from said first and/or second and/or third photonic signal; and/or
  an input connection optical fiber shared by the first) and/or second and/or third optical activation radiation, wavelength multiplexed, and an output connection optical fiber shared by transmitted optical spectra which constitute the first and/or second and/or third photonic signal, wavelength multiplexed, in which a plurality of sensor elements are made in a same fiber, and the photonic signals emitted by the sensors comprise transmitted optical spectra; and/or
  a connection optical fiber shared by the first and/or second and/or third optical activation radiation, wavelength multiplexed, and by the reflected spectra which form the first and/or second and/or third photonic signal, wavelength multiplexed, wherein a plurality of sensor elements are made in a same fiber, and the photonic signals emitted by the sensors comprise reflected optical spectra.

21. The sensorized brake pad of claim 15, comprising a base platform) of the brake pad in the friction material of the brake pad, and further comprising at least one detection element comprising:
  a casing made of polymer or mineral material, distinct from the brake pad and which is fixable to and/or incorporatable in the brake pad, said casing being configured to accommodate at least one fiber-optic strain sensor, fixed by an adhesive inside casing portions of said casing), and the at least one fiber-optic temperature sensor, and at least one portion of the connection optical interface;

at least one capillary connection tube exiting from the casing, configured to enclose one or more connection fibers of the connection optical interface;

wherein the sensorized brake pad further comprises a collector fixed to the brake pad which can be connected to a protective output tube of the connection optical interface external to the brake caliper and connectable to the reading/interrogation unit, and wherein the sensorized brake pad further comprises a capillary tube or frame structure) adapted to route and connect said at least one capillary connection tube to the collector, wherein said casing is made of at least one of organic, plastic, polymer material, and resin compound, and incorporates at least one fiber-optic strain sensor, by assembly with adhesives or co-molding, and wherein said at least one detection element together with said collector and said frame is fixed to the brake pad and/or incorporated into the brake pad in a fixed and predefined position, between said base platform in the friction material of the brake pad, by shape coupling or mechanical coupling between the base platform and the casing, so that at least one fiber-optic strain sensor is completely incorporated in the desired portion of friction material.

22. The sensorized brake pad of claim 15, comprising a plurality of detection elements, each comprising the casing and a respective at least one fiber-optic strain sensor incorporated therein.

23. A brake caliper for a disc braking system for vehicle, comprising at least one sensorized brake pad according claim 15.

24. A system for detecting and measuring a clamping force and/or a braking torque deriving from actuation of a friction braking system for vehicle, by a detection performed in at least one sensorized brake pad of a braking system, comprising:

at least one sensorized brake pad comprising:
a brake pad made of material adapted to generate braking friction when placed in contact with a friction brake disc by the brake caliper upon a braking event;

a casing containing at least one fiber-optic strain sensor, incorporated in a portion of friction material of the brake pad adhering to a base platform of the brake pad, said portion of friction material being sensitive to friction, so that a tangential shear strain to which the casing is subject in a tangential reference direction is representative of a tangential force acting on the brake pad, and a normal force to which the casing is subject in a normal reference direction is representative of a normal force acting on the brake pad, and representative of a clamping force and/or braking torque applied on the friction brake disc;

wherein said at least one fiber-optic strain sensor is configured to:
detect a first strain, present in a first position of the casing along a predefined first spatial direction, said first strain being dependent both on the normal force and on the tangential force acting on the casing;
detect a second strain, present in a second position of the casing along a predefined second spatial direction, said second strain being dependent both on the normal force and on the tangential force acting on the casing; and
generate a first photonic signal, representative of the first detected strain, and a second photonic signal, representative of the second detected strain;

a connection optical interface, connected to said at least one fiber-optic strain sensor, and adapted to be connected to an optical reading/interrogation unit to transmit said first photonic signal) and second photonic signal;

wherein the system further comprises:
an optical reading/interrogation unit, optically connected to the connection optical interface of at least one sensorized brake pad to receive a first photonic signal and a second photonic signal; said optical reading/interrogation unit being configured to generate one or more electrical signals, representative of the first detected strain and the second detected strain, on the basis of said received first photonic signal and second photonic signal; and a remote control unit, external to the sensorized brake pad, connected to said optical reading/interrogation unit to receive said one or more electrical signals, the remote control unit being configured to process the one or more electrical signals to obtain and supply a measurement of the clamping force and/or braking torque.

25. The system of claim 24, wherein the optical reading/interrogation unit is further configured to activate each fiber Bragg grating comprised in the sensor elements incorporated in the sensorized brake pad, by transmitting a first optical activation radiation and/or a second optical activation radiation and/or a third optical activation radiation, and/or wherein, when a plurality of sensor elements are made in a same optical fiber, each of the respective fiber Bragg grating is associated with a respective different central operating wavelength ($\lambda 1$, $\lambda 2$), and wherein the optical reading/interrogation unit is further configured to transmit, through the connection optical interface, the respective optical activation radiations to the plurality of sensor elements, at respective central operating wavelengths ($\lambda 1$, $\lambda 2$), by wavelength-division multiplexing (WDM) transmission techniques, and the optical reading/interrogation unit is further configured to receive, through the connection optical interface, and distinguish respective optical spectra either reflected or transmitted by each sensor element of the plurality of sensor elements by de-multiplexing using wavelength-division multiplexing (WDM) techniques.

26. The system of claim 24, wherein the optical reading/interrogation unit comprises:

a broadband optical radiation source, configured to transmit said first optical activation radiation and/or second optical activation radiation and/or, if a temperature sensor is present, third optical activation radiation;

an opto-electronic spectrometer receiver, configured to select the wavelength and/or plurality of wavelengths to be received, and further configured to receive each of the at least one first photonic signal and/or at least one second photonic signal and convert it into a respective at least one first electrical signal and/or second electrical signal; and/or receiving said third photonic signal and converting it to a third electrical signal.

27. The system of claim 24, wherein the optical reading/interrogation unit comprises:
- a tunable optical radiation source, configured to transmit said first optical activation radiation and/or second optical activation radiation and/or third optical activation radiation, each radiation being at a desired respective wavelength;
- a photo-diode opto-electronic receiver, configured to receive said first photonic signal and convert it into said first electrical signal and to receive said second photonic signal and convert it into said second electrical signal; and/or configured to receive said third photonic signal and convert it into said third electrical signal, and/or wherein the optical reading/interrogation unit is entirely made by a single integrated circuit implemented by photonic integrated circuit (PIC) technology, and wherein said single integrated circuit comprises:
- a broadband optical radiation source, configured to transmit said first optical activation radiation and/or second optical activation radiation and/or third optical activation radiation;
- at least one optical wavelength filtering element, tunable to the wavelength of a queried fiber Bragg grating, to select a respective photonic signal;
- a photo-diode opto-electronic receiver, configured to receive a photonic signal selected from said first photonic signal and second photonic signal and convert it into said first electrical signal or second electrical signal); and/or to receive said third photonic signal, if selected, and to convert it into said third electrical signal, and/or wherein the sensorized brake pad comprises a fiber-optic strain sensor of fiber Bragg grating type arranged in a birefringent fiber,
wherein the reading/interrogation unit comprises:
- a tunable optical radiation source, configured to transmit said first optical activation radiation and/or second optical activation radiation and/or third optical activation radiation, each radiation being at the desired respective wavelength;
- a polarization beam splitter configured to receive the photonic signal either reflected or transmitted by the birefringent fiber Bragg grating, composed of two components with different first birefringence polarization and second birefringence polarization, respectively, and to generate a first optical beam corresponding to a component with first polarization and a second optical beam corresponding to the component with second polarization;
- a first photo-diode opto-electronic receiver, configured to receive the first optical beam and to generate a corresponding first electrical signal;
- a second photo-diode opto-electronic receiver, configured to receive the second optical beam and to generate a corresponding second electrical signal, and/or wherein the optical reading/interrogation unit is integrated and/or accommodated in the sensorized brake pad.

28. The system of claim 24, comprising a plurality of sensorized brake pads belonging to one or more brake calipers, and a single optical reading/interrogation unit operationally connected to each sensorized brake pad of said plurality of sensorized brake pads.

29. The system of claim 24, wherein the remote control unit comprises at least one processor, in which one or more software programs are stored, configured to run an algorithm for calculating the clamping force and/or braking torque, on the basis of said detected first strain and second strain, and/or on the basis of said detected first strain, second strain and temperature.

30. A disc brake system for vehicle, comprising a plurality of brake pads according to claim 23,
and/or comprising a system for detecting and measuring a braking force and/or braking torque comprising at least one sensorized brake pad comprising:
- a brake pad made of material adapted to generate braking friction when placed in contact with a friction brake disc by the brake caliper upon a braking event;
- a casing containing at least one fiber-optic strain sensor, incorporated in a portion of friction material of the brake pad adhering to a base platform of the brake pad, said portion of friction material being sensitive to friction, so that a tangential shear strain to which the casing is subject in a tangential reference direction is representative of a tangential force acting on the brake pad, and a normal force to which the casing is subject in a normal reference direction is representative of a normal force acting on the brake pad, and representative of a clamping force and/or braking torque applied on the friction brake disc;
wherein said at least one fiber-optic strain sensor is configured to:
- detect a first strain, present in a first position of the casing along a predefined first spatial direction, said first strain being dependent both on the normal force and on the tangential force acting on the casing;
- detect a second strain, present in a second position of the casing along a predefined second spatial direction, said second strain being dependent both on the normal force and on the tangential force acting on the casing; and
- generate a first photonic signal, representative of the first detected strain, and a second photonic signal, representative of the second detected strain; and
- a connection optical interface, connected to said at least one fiber-optic strain sensor, and adapted to be connected to an optical reading/interrogation unit to transmit said first photonic signal and second photonic signal;
wherein the system further comprises:
- an optical reading/interrogation unit, optically connected to the connection optical interface of at least one sensorized brake pad to receive a first photonic signal and a second photonic signal; said optical reading/interrogation unit being configured to generate one or more electrical signals, representative of the first detected strain and the second detected strain, on the basis of said received first photonic signal and second photonic signal; and
- a remote control unit, external to the sensorized brake pad, connected to said optical reading/interrogation unit to receive said one or more electrical signals, the remote control unit being configured to process the one or more electrical signals to obtain and supply a measurement of the clamping force and/or braking torque.

* * * * *